(12) United States Patent
Cannillo

(10) Patent No.: US 11,463,006 B2
(45) Date of Patent: Oct. 4, 2022

(54) HYBRID MULTI-LEVEL POWER CONVERTER WITH INDUCTOR BYPASS

(71) Applicant: Dialog Semiconductor (UK) Limited, London (GB)

(72) Inventor: Francesco Cannillo, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 53 days.

(21) Appl. No.: 16/901,508

(22) Filed: Jun. 15, 2020

(65) Prior Publication Data
US 2021/0099088 A1    Apr. 1, 2021

(30) Foreign Application Priority Data
Sep. 30, 2019   (DE) .......................... 102019214978.2

(51) Int. Cl.
*H02M 3/158* (2006.01)
(52) U.S. Cl.
CPC ........ *H02M 3/1584* (2013.01); *H02M 3/1586* (2021.05)
(58) Field of Classification Search
None
See application file for complete search history.

(56) References Cited

U.S. PATENT DOCUMENTS

| | | | |
|---|---|---|---|
| 9,667,139 B2* | 5/2017 | Giuliano | H02M 3/158 |
| 10,003,261 B2 | 6/2018 | Petersen et al. | |
| 10,090,763 B1* | 10/2018 | Mercer | H02M 3/158 |
| 10,230,302 B2 | 3/2019 | Petersen | |
| 10,298,124 B2 | 5/2019 | Petersen et al. | |
| 10,355,591 B2* | 7/2019 | Granato | H02M 7/4837 |
| 10,680,512 B2* | 6/2020 | Babazadeh | H05B 45/3725 |
| 10,756,623 B1 | 8/2020 | Petersen | |
| 2014/0070787 A1 | 3/2014 | Arno | |
| 2018/0026518 A1* | 1/2018 | Liu | H02M 1/088 |
| | | | 323/312 |

FOREIGN PATENT DOCUMENTS

| | | |
|---|---|---|
| DE | 102015209330 A1 | 11/2016 |
| DE | 102015212331 A1 | 1/2017 |

(Continued)

OTHER PUBLICATIONS

German Office Action, File No. 10 2019 214 978.2, Applicant: Dialog Semiconductor (UK) Limited, dated Dec. 5, 2020, 6 pages.

(Continued)

*Primary Examiner* — Jeffrey A Gblende
(74) *Attorney, Agent, or Firm* — Saile Ackerman LLC; Stephen B. Ackerman

(57) ABSTRACT

The present document relates to power converters. A power converter has a first stage coupled between an input of the power converter and an intermediate node, and a second stage coupled between the intermediate node and an output of the power converter. The first stage has a capacitive voltage divider with a first flying capacitor, and the second stage has a second flying capacitor and an inductor. On the one hand, the power converter establishes, in a magnetizing state, a magnetizing current path in the second stage from the intermediate node via the inductor to the output of the power converter. On the other hand, the power converter establishes, in a capacitive state, a parallel current path in the second stage from the intermediate node via the second flying capacitor to the output of the power converter.

31 Claims, 19 Drawing Sheets

(56) References Cited

FOREIGN PATENT DOCUMENTS

DE 102016225795 A1 6/2018
GB 2555902 A 5/2018

OTHER PUBLICATIONS

Co-Pending US Patent, "Implicit On-Time Regulated Hybrid Converter," U.S. Appl. No. 16/705,171, filed Dec. 5, 2019, Mihail Jefremow, 28 pages.
Co-Pending US Patent, "A Multi-Level Power Converter," U.S. Appl. No. 16/386,761, filed Apr. 17, 2019, Holger Petersen, 30 pages.
"Zero Inductor Voltage Multilevel Bus Converter," by Samuel Webb et al., 2018 IEEE Applied Power Electronics Conference and Exposition (APEC), Mar. 4-8, 2018, pp. 2175-2482.
"A Fully-Integrated Switched-Capacitor 2:1 Voltage Converter with Regulation Capability and 90% Efficiency at $2.3A/mm^2$," by Leland Chang et al., 2010 Symposium on VLSI Circuits/Technical Digest of Technical Papers, Jul. 2010, pp. 55-56.
"Multi-Level Conversion: High Voltage Choppers and Voltlage-Source Inverters," by T.A. Meynard et al., Materials Science, Engineering PESC '92 Record. 23rd Annual IEEE Power Electronics Specialists Conference, Jun. 29-Jul. 3, 1992, pp. 397-403.
"A Flying Capacitor Multilevel Converter with Sampled Valley-Current Detection for Multi-Mode Operation and Capacitor Voltage Balancing," by Jan S. Rentmeister et al., 2016 IEEE Energy Conversion Congress and Exposition (ECCE), Sep. 18-22, 2016, 8 pages.

\* cited by examiner $$\frac{V_{out}}{V_{in}} = \frac{2D}{1 + 2D} \quad \text{for } 0 \leq D \leq 0.5$$

$$\frac{V_{out}}{V_{in}} = \frac{1}{3 - 2D} \quad \text{for } 0.5 \leq D \leq 1$$

$$\frac{I_L}{I_{out}} = \frac{1}{1 + 2D} \quad \text{for } 0 \leq D \leq 0.5$$

$$\frac{I_L}{I_{out}} = \frac{1}{3 - 2D} \quad \text{for } 0.5 \leq D \leq 1$$

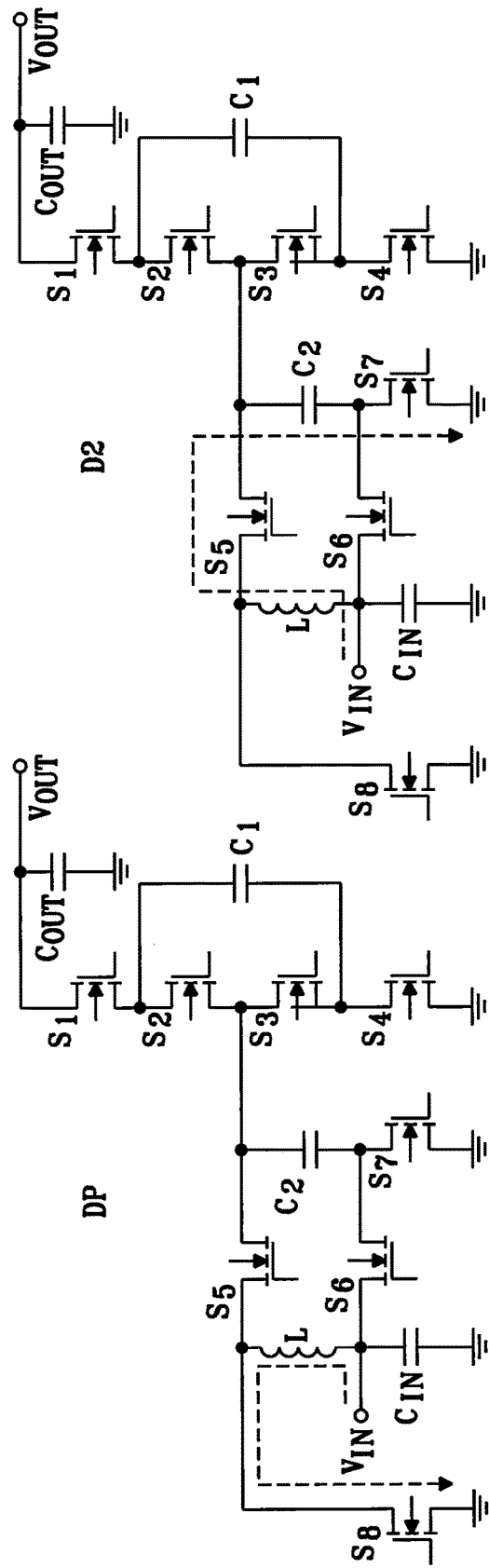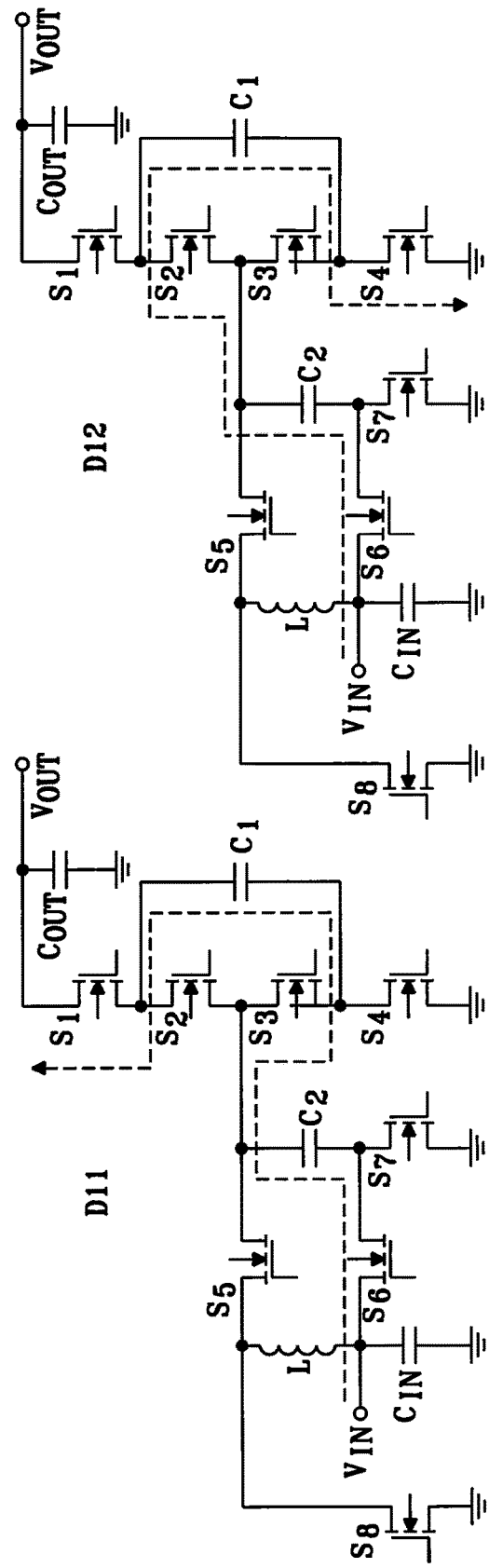
FIG. 17A  FIG. 17B  FIG. 17C  FIG. 17D

HYBRID MULTI-LEVEL POWER CONVERTER WITH INDUCTOR BYPASS

TECHNICAL FIELD

The present document relates to power converters. More specifically, the present document relates to a hybrid multi-level power converter with an inductor bypass.

BACKGROUND

There is an increasing demand for high-efficiency, regulated power converters in several market segments such as e.g. solid-state drives (SSDs), computing device, charging devices, or wearable power management integrated circuits (PMICs). Specifically, it is highly desirable to design power converters with higher efficiency and smaller area than conventional buck converters. With regard to the overall area of the power converter, the sizes of the required inductors and capacitors are important design parameters. Thus, it is important to reduce the sizes of the letter circuit elements.

SUMMARY

Moreover, there is a demand for power converters that perform power conversion with a small input-to-output voltage conversion ratio $V_{OUT}/V_{IN}$, in particular when $V_{OUT}/V_{IN} < \frac{1}{4}$. As a further objective, it is advantageous to the converter efficiency to limit the voltage across the inductor during the operation of the power converter.

The present document addresses the above mentioned technical problems. According to an aspect, a power converter may comprise a first stage coupled between an input of the power converter and an intermediate node, and a second stage coupled between the intermediate node and an output of the power converter. The first stage may comprise a capacitive voltage divider with a first flying capacitor, and the second stage may comprise a second flying capacitor and an inductor. On the one hand, the power converter may be configured to establish, in a magnetizing state, a magnetizing current path in the second stage from the intermediate node via the inductor to the output of the power converter. On the other hand, the power converter may be configured to establish, in a capacitive state, a parallel current path in the second stage from the intermediate node via the second flying capacitor to the output of the power converter. The parallel current path may also flow through the first flying capacitor of the first stage. The parallel current path may not flow through the inductor.

The power converter may be configured to disable, during the magnetizing state, the first stage of the power converter. In particular, the power converter may be configured to isolate the input of the power converter from the intermediate node during the magnetizing state.

The skilled person will readily understand that the adjective "magnetizing" is used here to describe the purpose of the magnetizing state and magnetizing current path, respectively. While in the magnetizing state, a current may flows along said magnetizing current path, resulting in a magnetic field generated by said inductor. In other words, the inductor may be said to be "magnetized" during said magnetizing state.

The power converter may be configured to generate an output voltage at the output of the power converter which is smaller than an input voltage at the input of the power converter. In other words, the power converter may be denoted as so-called buck power converter. Moreover, as the power converter comprises both inductors and capacitors as (temporary) energy storage elements, the described power converter may be denoted as a hybrid power converter.

The capacitive voltage divider may be a circuit that produces an output voltage that is a fraction of its input voltage. For example, the capacitive voltage divider may be configured to generate an output voltage which is half of an input voltage of the capacitive voltage divider. At the same time, the capacitive voltage divider may be configured to generate an output current which is twice an input current of the capacitive voltage divider.

Preferably, the parallel current path may be arranged in parallel with regard to the magnetizing current path between the intermediate node and the output of the power converter. Since the magnetizing current path is established during the magnetizing state and the parallel current path is established during the capacitive state, the magnetizing current path and the parallel current path may not be established at the same point in time. Rather, the power converter may be configured to establish the magnetizing current path during a first time interval, and the power converter may be configured to establish the parallel current path during a second time interval, wherein said first time interval and said second time interval are non-overlapping. Nevertheless, the two current paths may be said to be parallel with regard to each other in a spatial manner (i.e. within the topology of the described power converter). For example, it is preferable that the parallel current path does not comprise the inductor. As a result, a part of a load current drawn at the output of the power converter may bypass the inductor via the parallel current path during the capacitive state (e.g. during the second time interval) and resistive losses within the inductor may be avoided during the capacitive state.

The power converter may comprise a bypass switch. The power converter may be configured to establish the parallel current path during the capacitive state from the intermediate node via the second flying capacitor and via the bypass switch to the output of the power converter.

The bypass switch may be implemented with any suitable device, such as, for example, a metal-oxide-semiconductor field effect transistor (MOSFET), an insulated-gate bipolar transistor (IGBT), a MOS-gated thyristor, or other suitable power devices The bypass switch may have a gate to which a driving voltage or control signal may be applied to turn the bypass switch on (i.e. to close the switching element) or to turn the bypass switch off (i.e. to open the switching element).

The power converter may comprise a first magnetizing switch and a second magnetizing switch. The power converter may be configured to establish the magnetizing current path during the magnetizing state from a reference potential, via the first magnetizing switch, via the second flying capacitor (and via the intermediate node), via the second magnetizing switch, and via the inductor, to the output of the power converter.

Similar as the bypass switch, the first magnetizing switch and the second magnetizing switch may be implemented with any suitable device, such as, for example, a MOSFET. Again, the skilled person will readily understand that the adjective "magnetizing" is used here to describe the function of the two switches within the magnetizing current path: When both the first magnetizing switch and the second magnetizing switch are turned on, a current may flow through the inductor which is magnetizing said inductor. The first magnetizing switch and the second magnetizing switch themselves are neither magnetized nor do they exhibit magnetic characteristics which go beyond the magnetic characteristics of conventional switching elements such as e.g. transistors.

Throughout this document, the term "reference potential" is meant in its broadest possible sense. In particular, the reference potential is not limited to ground i.e. a reference potential with a direct physical connection to earth. Rather, the term "reference potential" may refer to any reference point to which and from which electrical currents may flow or from which voltages may be measured. Moreover, it should be mentioned that the reference potentials mentioned in this document may not necessarily refer to the same physical contact. Instead, the reference potentials mentioned in this document may relate to different physical contacts although reference is made to "the" reference potential for ease of presentation.

At the output of the power converter, an output capacitor may be connected between the output of the power converter and the reference potential.

The power converter may be configured to establish, in a demagnetizing state, a demagnetizing current path from the reference potential via the inductor to the output of the power converter. As in the magnetizing state, the power converter may be configured to disable, during the demagnetizing state, the first stage of the power converter. Again, the power converter may be configured to isolate the input of the power converter from the intermediate node during the demagnetizing state.

The power converter may comprise a demagnetizing switch, and the power converter may be configured to establish the demagnetizing current path during the demagnetizing state from the reference potential via the demagnetizing switch and via the inductor to the output of the power converter. The demagnetizing switch may be implemented with any suitable device, such as, for example, a MOSFET.

The capacitive state may be either a first capacitive sub-state or a second capacitive sub-state. The power converter may be configured to establish, in the first capacitive sub-state, a first current path in the first stage from the input of the power converter via the first flying capacitor to the intermediate node. Further, the power converter may be configured to establish, in the second capacitive sub-state, a second current path in the first stage from a reference potential via the first flying capacitor to the intermediate node.

Still, both in the first and the second capacitive sub-state, the power converter may be configured to establish said parallel current path in the second stage from the intermediate node via the second flying capacitor to the output of the power converter, thereby increasing the efficiency of the power converter.

The power converter may comprise a first switch, a second switch, a third switch, and a fourth switch. The power converter may be configured to establish, in the first capacitive sub-state, the first current path from the input of the power converter, via the first switch, via the first flying capacitor, and via the third switch to the intermediate node. The power converter may be configured to establish, in the second capacitive sub-state, the second current path from the reference potential, via the fourth switch, via the first flying capacitor, and via the second switch to the intermediate node. The first switch, the second switch, the third switch, and the fourth switch may be implemented with any suitable devices, such as, for example, MOSFETs.

The power converter may be configured to switch between the different states according to the following ordered state sequence: the magnetizing state; the demagnetizing state; the capacitive state. For example, the power converter may comprise a dedicated control unit configured to implement the described switching scheme. During the magnetizing state, the inductor current may increase, whereas the inductor current may decrease during the demagnetizing state. During the capacitive state, the inductor current may be e.g. 0. In other words, it may be said that the described switching scheme results in the power converter being operated in discontinuous conduction mode (DCM).

More specifically, when differentiating between the first and the second capacitive sub-states, the power converter may be configured to switch between the different states according to the following ordered state sequence: the magnetizing state; the demagnetizing state; the first capacitive sub-state; the magnetizing state; the demagnetizing state; the second capacitive sub-state. Again, during the first and the second capacitive sub-states, the current may bypass the inductor, and the inductor current may be e.g. 0 during both the first and the second capacitive sub-states.

The power converter may be configured to switch from the magnetizing state to the demagnetizing state (only) when a current through the inductor reaches a first current threshold. For example, the power converter may comprise a feedback circuit configured to determine the duration of the magnetizing state and to switch from the magnetizing state to the demagnetizing state. The feedback circuit may comprise a current-to-voltage converter configured to convert a current value of the current through the inductor into a corresponding voltage value. The feedback circuit may further comprise a comparator configured to compare the corresponding voltage value against a voltage threshold, wherein said voltage threshold is indicative of the first current threshold.

Alternatively, the power converter may be configured to switch from the magnetizing state to the demagnetizing state after a predetermined, constant time interval.

The power converter may be configured to switch from the demagnetizing state to the capacitive state when a current through the inductor reaches a second current threshold. According to the above-defined ordered state sequence, the power converter may be configured to switch from the demagnetizing state either to the first capacitive subs-state or to the second capacitive subs-state in an alternating manner. Preferably, the second current threshold may be smaller than the first current threshold. For example, the second current threshold may be 0A, i.e. the power converter may comprise a zero current detector for detecting a zero current through the inductor, and terminate the demagnetizing state upon detection of this zero crossing.

Again, the power converter may comprise a feedback circuit configured to determine a duration of the demagnetizing state and to switch from the demagnetizing state to one of the two capacitive states. The feedback circuit may comprise the above described current-to-voltage converter configured to convert the current through the inductor into a corresponding voltage value. The feedback circuit may further comprise a comparator configured to compare the corresponding voltage value against a second voltage threshold, wherein said second voltage threshold (e.g. 0V) is indicative of the second current threshold (e.g. 0A).]

The power converter may be configured to switch from the capacitive state to the magnetizing state when an output voltage at the output of the power converter falls below an output reference voltage. In other words, the power converter may be configured to switch from the first capacitive sub-state to the magnetizing state when the output voltage at the output of the power converter falls below the output reference voltage, and the power converter may be configured to switch from the second capacitive sub-state to the magnetizing state when the output voltage at the output of the power converter falls below the output reference voltage. To this end, the power converter may comprise a further feedback circuit for comparing the output voltage at the output of the power converter with said output reference voltage.

The demagnetizing state may be either a first demagnetizing sub-state or a second demagnetizing sub-state. The power converter may be configured to establish, in the first demagnetizing sub-state, said demagnetizing current path and an additional current path from the input of the power converter, via the first flying capacitor, via the second flying capacitor, to the output of the power converter. Said additional current path may be also denoted as a capacitive current path since it traverses both flying capacitors while bypassing the inductor. On the other hand, the power converter may be configured to establish, in the second demagnetizing sub-state, said demagnetizing current path and an additional current path from the reference potential, via the first flying capacitor, via the second flying capacitor, to the output of the power converter. Also, the latter additional current path may be denoted as a capacitive current path since it traverses both flying capacitors while bypassing the inductor. In other words, both during the first and the second demagnetizing sub-states, an additional current may flow across both flying capacitors, wherein said additional current may not flow across the inductor.

The purpose of the additional current paths is to increase the efficiency of the power converter by bypassing the inductor. The charge on the first flying capacitor may be balanced during the two demagnetizing sub-states. The charge on the second flying capacitor may be balanced between the magnetizing state and each of the two demagnetizing sub-states.

The power converter may be configured to switch between the different states according to the following ordered state sequence: the magnetizing state; the first demagnetizing sub-state; the magnetizing state; the second demagnetizing sub-state. According to this switching scheme, a non-zero current may flow across the inductor at any time. Thus, it may be said that the described switching scheme results in the power converter being in a continuous conduction mode (CCM). As an advantage, voltages of the flying capacitors may be regulated without letting the inductor current reach 0.

According to another aspect, a method of operating a power converter is described. The method may comprise steps which correspond to the features of the power converter described in the present document. Specifically, the method may be suitable for a power converter comprising a first stage coupled between an input of the power converter and an intermediate node, and a second stage coupled between the intermediate node and an output of the power converter. The first stage may comprise a capacitive voltage divider with a first flying capacitor, and the second stage may comprise a second flying capacitor and an inductor. The method may comprise establishing, in a magnetizing state, a magnetizing current path in the second stage from the intermediate node via the inductor to the output of the power converter. The method may comprise establishing, in a capacitive state, a parallel current path in the second stage from the intermediate node via the second flying capacitor to the output of the power converter.

The method may comprise establishing the parallel current path during the capacitive state from the intermediate node via the second flying capacitor and via a bypass switch to the output of the power converter.

The method may comprise establishing the magnetizing current path during the magnetizing state from a reference potential via a first magnetizing switch, via the second flying capacitor, via a second magnetizing switch, and via the inductor to the output of the power converter.

The method may comprise establishing, in a demagnetizing state, a demagnetizing current path from a reference potential via the inductor to the output of the power converter. The method may comprise establishing the demagnetizing current path during the demagnetizing state from the reference potential via a demagnetizing switch and via the inductor to the output of the power converter.

The capacitive state may be either a first capacitive sub-state or a second capacitive sub-state. The method may comprise establishing, in the first capacitive sub-state, a first current path in the first stage from the input of the power converter via the first flying capacitor to the intermediate node. Further, the method may comprise establishing, in the second capacitive sub-state, a second current path in the first stage from a reference potential via the first flying capacitor to the intermediate node. To be more specific, the method may comprise establishing, in the first capacitive sub-state, the first current path from the input of the power converter, via a first switch, via the first flying capacitor, and via a third switch to the intermediate node. The method may comprise establishing, in the second capacitive sub-state, the second current path from the reference potential, via a fourth switch, via the first flying capacitor, and via a second switch to the intermediate node.

The method may comprise switching between the different states according to the following ordered state sequence: from the magnetizing state; to the demagnetizing state; to the capacitive state. Taking into account the more detailed nature of the capacitive state, the method may comprise switching between the different states according to the following ordered state sequence: from the magnetizing state; to the demagnetizing state; to the first capacitive sub-state; to the magnetizing state; to the demagnetizing state; to the second capacitive sub-state.

The method may comprise switching from the magnetizing state to the demagnetizing state when a current through the inductor reaches a first current threshold. The method may comprise switching from the demagnetizing state to the capacitive state when a current through the inductor reaches a second current threshold. The method may comprise switching from the capacitive state to the magnetizing state when an output voltage at the output of the power converter falls below an output reference voltage.

The demagnetizing state may be either a first demagnetizing sub-state or a second demagnetizing sub-state. The method may comprise establishing, in the first demagnetizing sub-state, said demagnetizing current path and a current path from the input of the power converter, via the first flying capacitor, via the second flying capacitor, to the output of the power converter. The method may comprise establishing, in the second demagnetizing sub-state, said demagnetizing current path and a current path from the reference potential, via the first flying capacitor, via the second flying capacitor, to the output of the power converter.

The method may comprise switching between the different states according to the following ordered state sequence:

from the magnetizing state; to the first demagnetizing sub-state; to the magnetizing state; to the second demagnetizing sub-state.

According to another aspect, a power converter may comprise a first stage coupled between an input of the power converter and an intermediate node, and a second stage coupled between the intermediate node and an output of the power converter. The second stage may comprise a capacitive voltage multiplier with a first flying capacitor, and the first stage may comprise a second flying capacitor and an inductor. The power converter may be configured to establish, in a demagnetizing state, a demagnetizing current path in the first stage from the input of the power converter via the inductor to the intermediate node. Alternatively, the power converter may be configured to establish, in a capacitive state, a parallel current path in the first stage from the input of the power converter via the second flying capacitor to the intermediate node.

The power converter may be configured to disable, during the demagnetizing state, the second stage of the power converter. In particular, the power converter may be configured to isolate the intermediate node from output of the power converter during the demagnetizing state.

The power converter may be configured to generate an output voltage at the output of the power converter which is greater than an input voltage at the input of the power converter. In other words, the power converter may be denoted as so-called boost power converter.

The capacitive voltage multiplier may be a circuit that produces an output voltage that is a multiple of its input voltage. For example, the capacitive voltage multiplier may be configured to generate an output voltage which is twice an input voltage of the capacitive voltage multiplier. At the same time, the capacitive voltage multiplier may be configured to generate an output current which is half of an input current of the capacitive voltage multiplier.

Preferably, the parallel current path may be arranged in parallel with regard to the demagnetizing current path between the input of the power converter and intermediate node. In other words, it is preferable that the parallel current path does not comprise the inductor. As a result, a part of a load current drawn at the output of the power converter may bypass the inductor via the parallel current path during the demagnetizing state, and resistive losses within the inductor may be avoided during the capacitive state.

The power converter may comprise a bypass switch, wherein the power converter is configured to establish the parallel current path during the capacitive state from the input of the power converter via the bypass switch and via the second flying capacitor to the intermediate node.

The power converter may comprise a first demagnetizing switch and a second demagnetizing switch, and the power converter may be configured to establish the demagnetizing current path during the demagnetizing state from the input of the power converter via the inductor, via the first demagnetizing switch, via the second flying capacitor, and via the second demagnetizing switch to a reference potential.

The power converter may be configured to establish, in a magnetizing state, a magnetizing current path from the input of the power converter via the inductor to a reference potential. For example, the power converter may comprise a magnetizing switch, and the power converter may be configured to establish the magnetizing current path during the magnetizing state from the input of the power converter via the inductor and via the magnetizing switch to the reference potential.

The capacitive state may be either a first capacitive sub-state or a second capacitive sub-state, and the power converter may be configured to establish, in the first capacitive sub-state, a first current path in the second stage from the intermediate node via the first flying capacitor to the output of the power converter. Alternatively, the power converter may be configured to establish, in the second capacitive sub-state, a second current path in the second stage from the intermediate node via the first flying capacitor to a reference potential.

The magnetizing state may be either a first magnetizing sub-state or a second magnetizing sub-state. The power converter may be configured to establish, in the first magnetizing sub-state, said magnetizing current path and a current path from the input of the power converter, via the second flying capacitor, via the first flying capacitor to the output of the power converter. The power converter may be configured to establish, in the second magnetizing sub-state, said magnetizing current path and a current path from the input of the power converter, via the second flying capacitor, via the first flying capacitor to a reference potential.

The power converter may be configured to switch between the different states according to the following ordered state sequence: the demagnetizing state; the first magnetizing sub-state; the demagnetizing state; the second magnetizing sub-state.

According to yet another aspect, a method of operating a power converter is presented. The method may comprise steps which correspond to the features of the power converter described in the present document. The power converter may comprise a first stage coupled between an input of the power converter and an intermediate node, and a second stage coupled between the intermediate node and an output of the power converter. The second stage may comprise a capacitive voltage multiplier with a first flying capacitor, and the first stage may comprise a second flying capacitor and an inductor. The method may comprise establishing, in a demagnetizing state, a demagnetizing current path in the first stage from the input of the power converter via the inductor to the intermediate node. The method may comprise establishing, in a capacitive state, a parallel current path in the first stage from the input of the power converter via the second flying capacitor to the intermediate node.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which

FIGS. 17A, 17B, 17C and 17D show different states of the exemplary boost converter topology of FIG. 16;

DESCRIPTION

Figure 1:
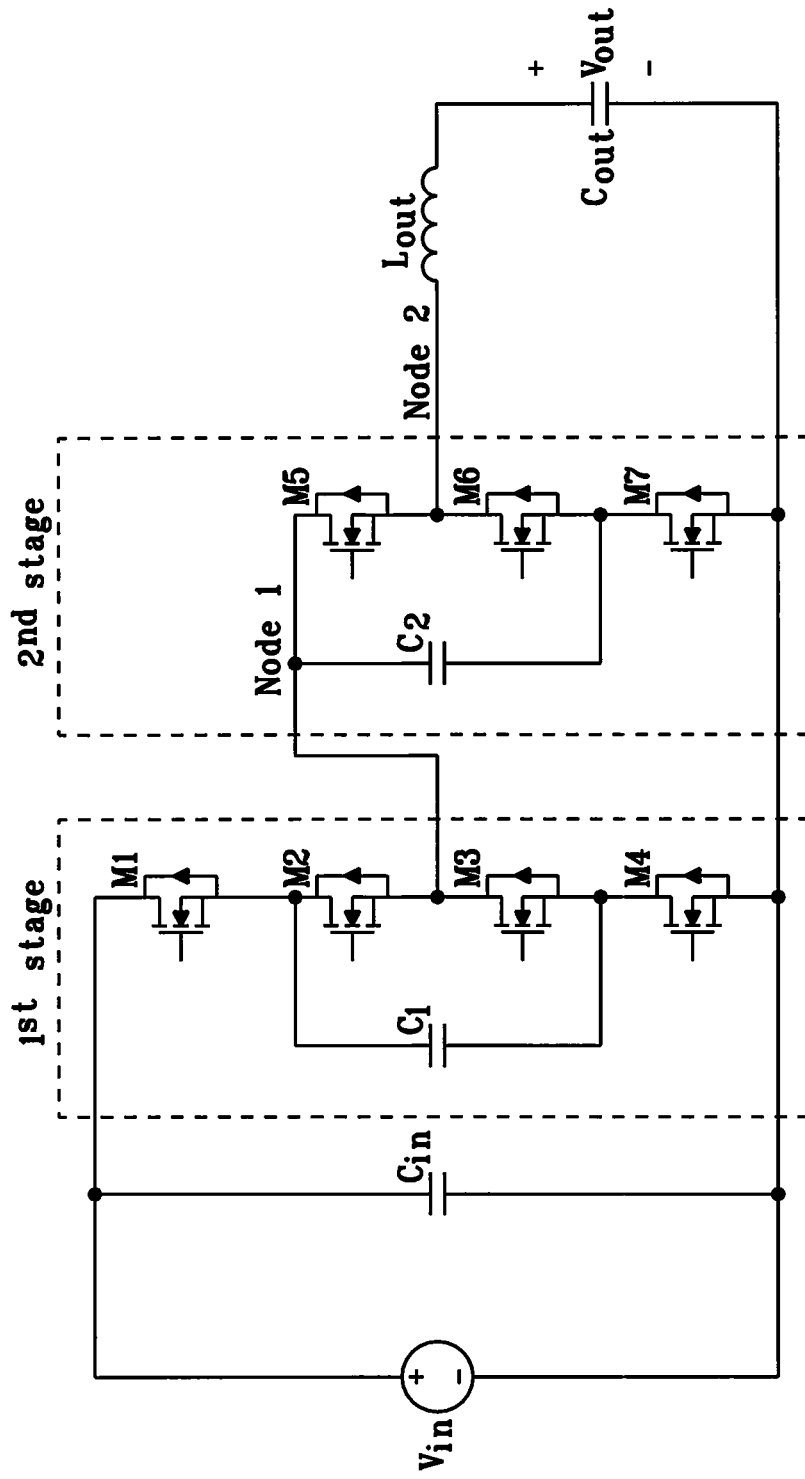
FIG. 1 shows an exemplary hybrid 4:1 power converter topology.
Figure 2:
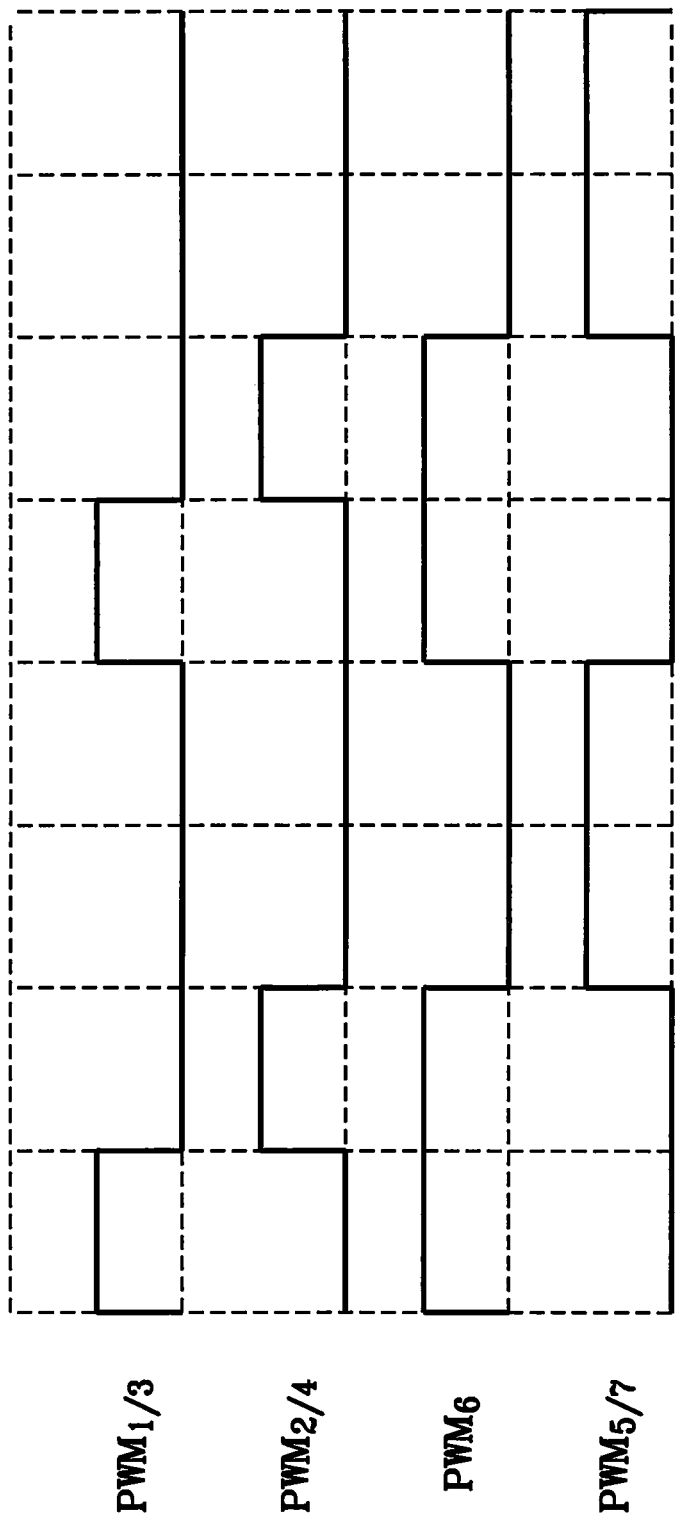
FIG. 2 shows an exemplary switching sequence for the switches of the power converter in FIG. 1.

FIG. 1 shows an exemplary hybrid 4:1 power converter topology. The topology illustrated in FIG. 1 achieves an unregulated 4:1 conversion. It comprises a cascade of two 2:1 capacitive dividers, each of them using a flying capacitor $C_1$ and $C_2$. The second stage consists of only three out of the four FETs typically used in a 2:1 capacitive divider: the converter timing which is depicted in FIG. 2 guarantees that the second stage operates as a 2:1 divider. The inductor $L_{OUT}$ is used to limit the current flowing through the capacitors when they are switched. The inductance value of $L_{OUT}$ is made intentionally small so that the capacitors' equivalent series resistance (ESR) and the FETs' on-resistance damp its effect. Therefore, the flying capacitors $C_1$ and $C_2$ do not need a dedicated regulation as the overall behaviour is equivalent to that of a purely capacitive 4:1 converter. The nominal voltage across the flying capacitors is $V_{IN}/2$ and $V_{IN}/4$ for $C_1$ and $C_2$, respectively.

In general, a converter as the one of FIG. 1, in which the inductor decouples the converter output from the flying capacitors, requires regulation for its flying capacitors. Flying capacitors' regulation can be achieved by applying a regulation scheme that samples the inductor current at a fixed time interval within the switching interval (i.e. valley/peak current control).

In this document, the voltage rating of a MOSFET device may be regarded as the maximum $|T_{DS}$ drain-source voltage that a device could be exposed to without getting damaged. It is desirable to reduce the voltage rating compared to a conventional buck converter that requires $V_{IN}$ rated MOSFET devices.

Figure 3:
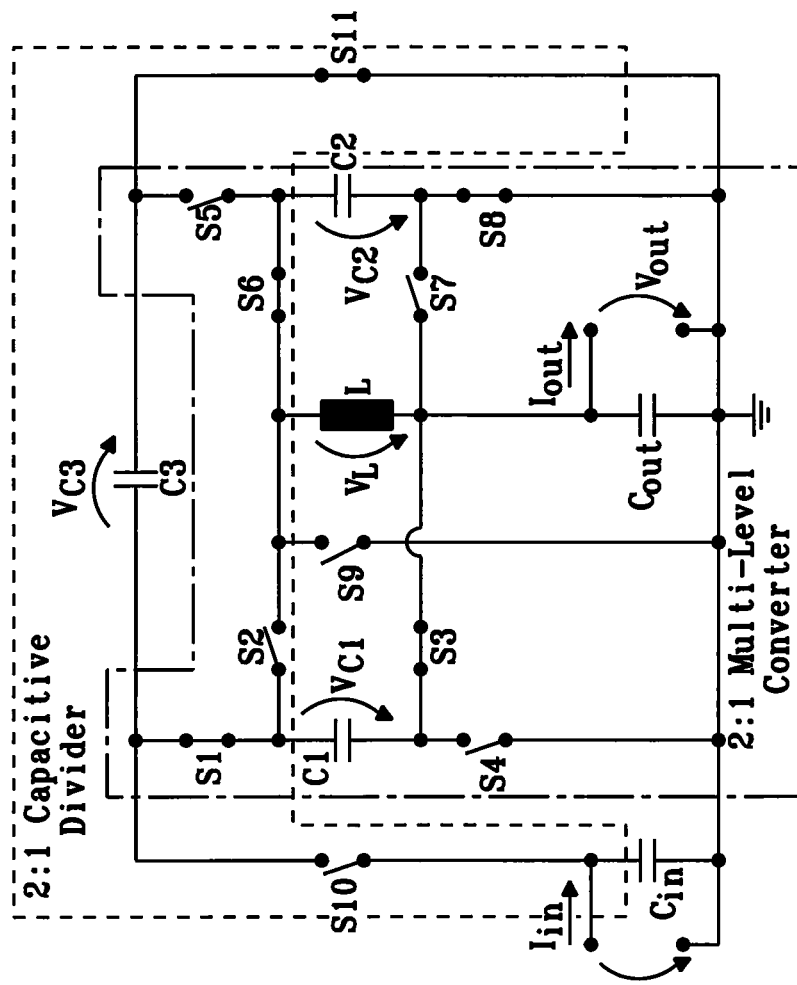
FIG. 3 shows an exemplary interleaved 4:1 hybrid power converter topology.
Figure 4:
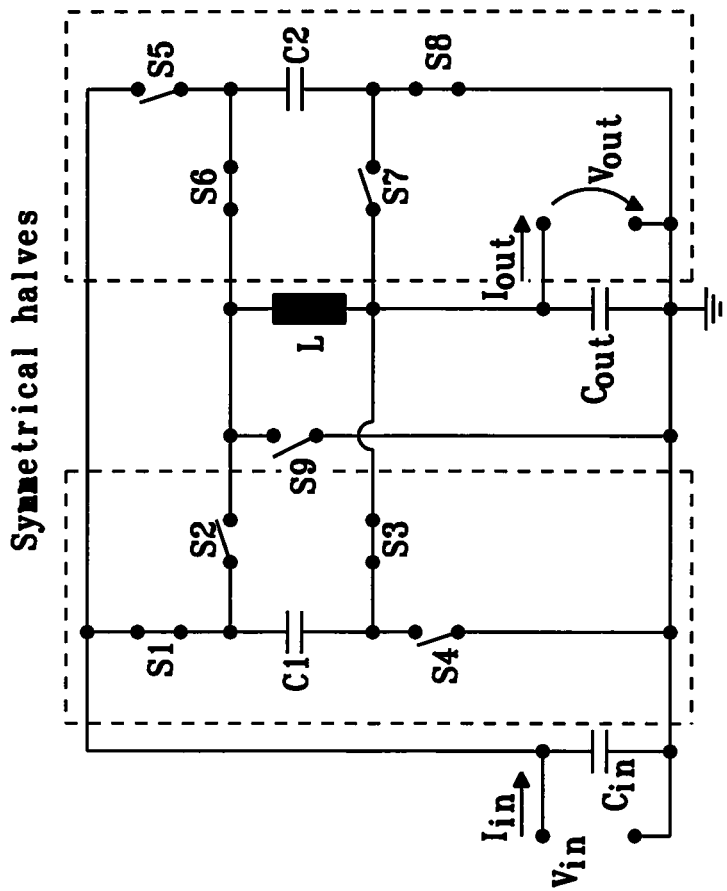
FIG. 4 shows an exemplary interleaved 2:1 hybrid power converter topology.
Figure 5A:
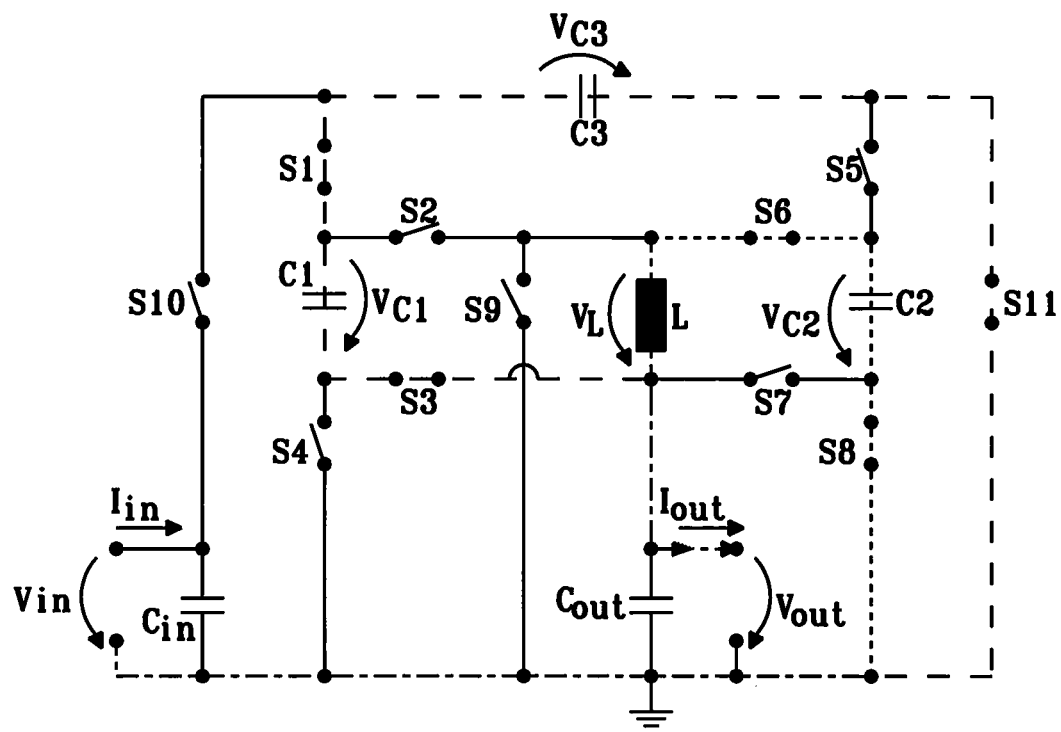
FIGS. 5A and 5B show two main states of the interleaved 4:1 hybrid power converter topology of FIG. 3.
Figure 5B:
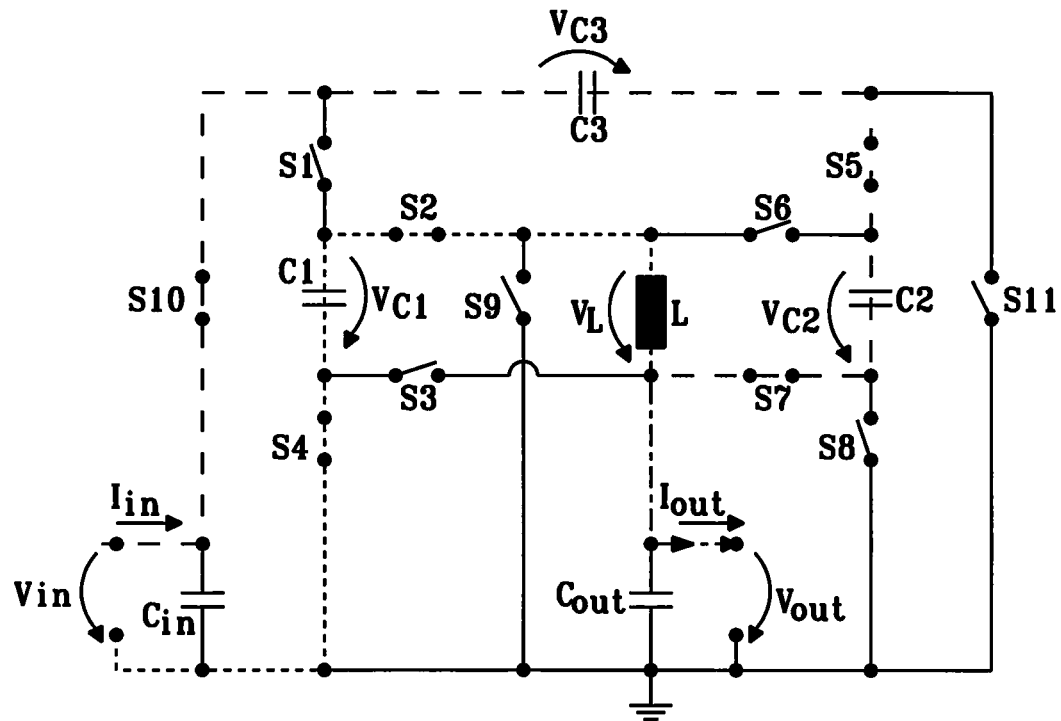

FIG. 3 shows an exemplary interleaved 4:1 hybrid power converter topology. The illustrated topology also targets an efficient power conversion for $V_{OUT}/V_{IN} < 1/4$. The voltage across the flying capacitor $C_3$ is regulated at approximately $V_{IN}/2$. Indeed, a 2:1 capacitive divider used as first stage in FIG. 1 can be identified in the topology of FIG. 3. In particular, M1 of FIG. 1 corresponds to S10 of FIG. 3, M2 of FIG. 1 corresponds to (S1+S2) of FIG. 3, M3 of FIG. 1 corresponds to (S5+S6) of FIG. 3, and M4 of FIG. 1 corresponds to S9 of FIG. 3. It is also possible to identify the topology of the interleaved 2:1 hybrid multi-level converter displayed in FIG. 4. The interleaved operation of the two symmetrical halves automatically regulates the flying capacitors $C_1$ and $C_2$ at a voltage of $V_{IN}/2 - V_{OUT}$ (main regulation states of the circuit in FIG. 3 shown in FIGS. 5A and 5B) when the flying capacitor $C_3$ is regulated at $V_{IN}/2$. In continuous conduction mode (CCM) the inductor current ripple for the converter of in FIG. 3 is nulled for $V_{OUT}/V_{IN} = 1/4$. Output voltages below $V_{IN}/4$ are achieved by introducing a de-magnetization phase with switch S9. In addition, up to 50% (depending on the conversion ratio) of the output current bypasses the inductor via the capacitive paths of $C_1$ and $C_2$. Therefore, the portion of current bypassing the inductor does not cause losses in the direct current resistance DCR of the inductor (up to 75% reduction). In steady-state condition, the voltage rating is $V_{OUT}$ for switches S1, S3, S4, S5, S7, S8 and $V_{IN}/2 - V_{OUT}$ for S2, S6, S9 and $V_{IN}/2$ for switches S10, S11. Again, the voltage rating of a switch may be regarded as the maximum voltage that a switch may be exposed to without getting damaged.

Figure 6:
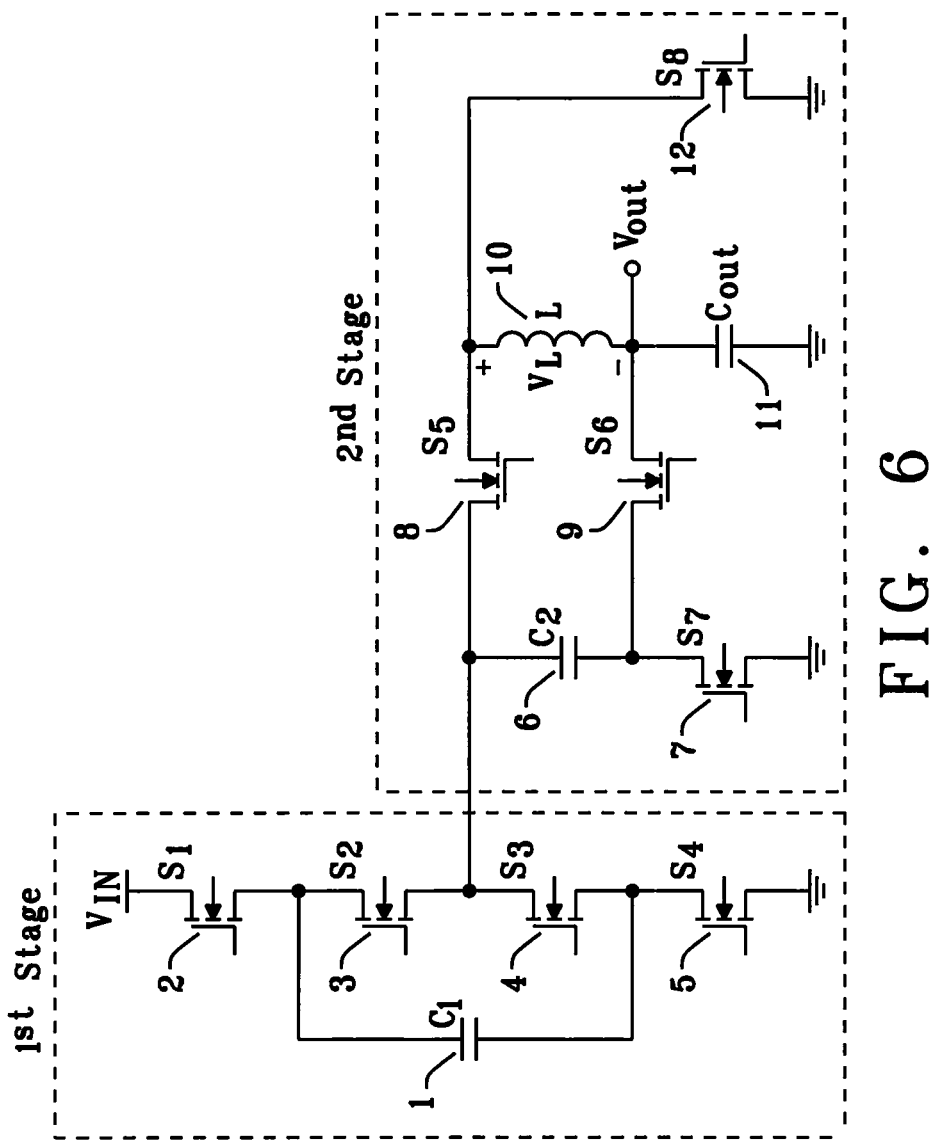
FIG. 6 shows yet another exemplary 4:1 hybrid power converter topology.

FIG. 6 shows yet another exemplary 4:1 hybrid power converter topology which is operated in discontinuous conduction mode (DCM). The exemplary power converter comprises a first stage with a first flying capacitor 1 ($C_1$), a first switch 2 ($S_1$), a second switch 3 ($S_2$), a third switch 4 ($S_3$), and a fourth switch 5 ($S_4$). The second stage comprises a second flying capacitor 6 ($C_2$), an inductor 10 (L), a bypass switch 9 ($S_6$), a first magnetizing switch 7 ($S_7$), a second magnetizing switch 8 ($S_5$), a demagnetizing switch 12 ($S_8$), and an output capacitor 11 ($C_{OUT}$). As will be explained in the following description, the flying capacitors $C_1$ and $C_2$ are automatically regulated to $V_{IN}/2$ and $V_{IN}/2 - V_{OUT}$, respectively.

The power converter of FIG. 6 operates in discontinuous conduction mode (DCM) according to the states shown in FIGS. 7-10.

Figure 7:
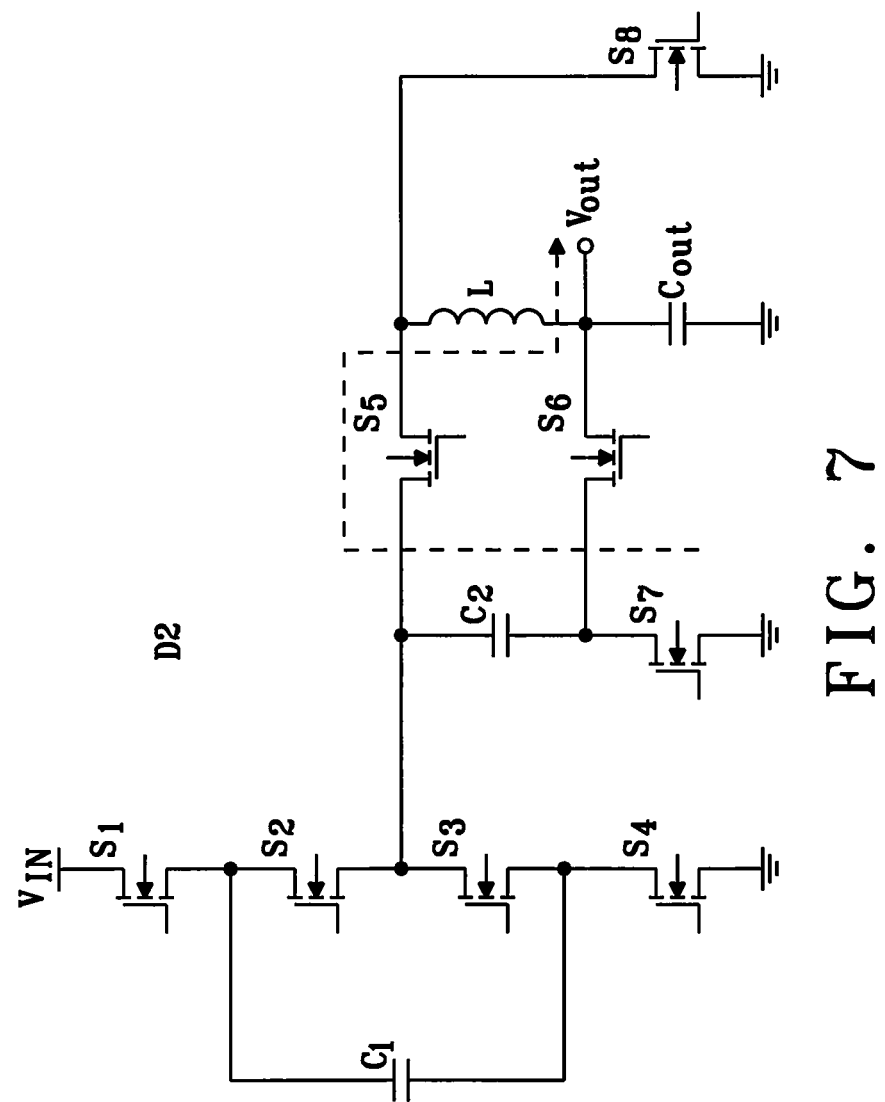
FIG. 7 shows a magnetizing state of the power converter of FIG. 6.

FIG. 7 shows a magnetizing state (D2) of the power converter of FIG. 6. The dashed arrow represents the current flow during this state. During state D2, since switches S5 and S7 are closed (all other switches may be open), the capacitor $C_2$ (charged at a voltage $V_{IN}/2 - V_{OUT}$) may magnetize the inductor. The voltage across the inductor (according to the polarity in FIG. 6) is $v_L = V_{IN}/2 - 2V_{OUT}$. The duration of this state can be determined either by a constant ON-time or by a peak inductor current limit $I_{peak}$.

Figure 8:
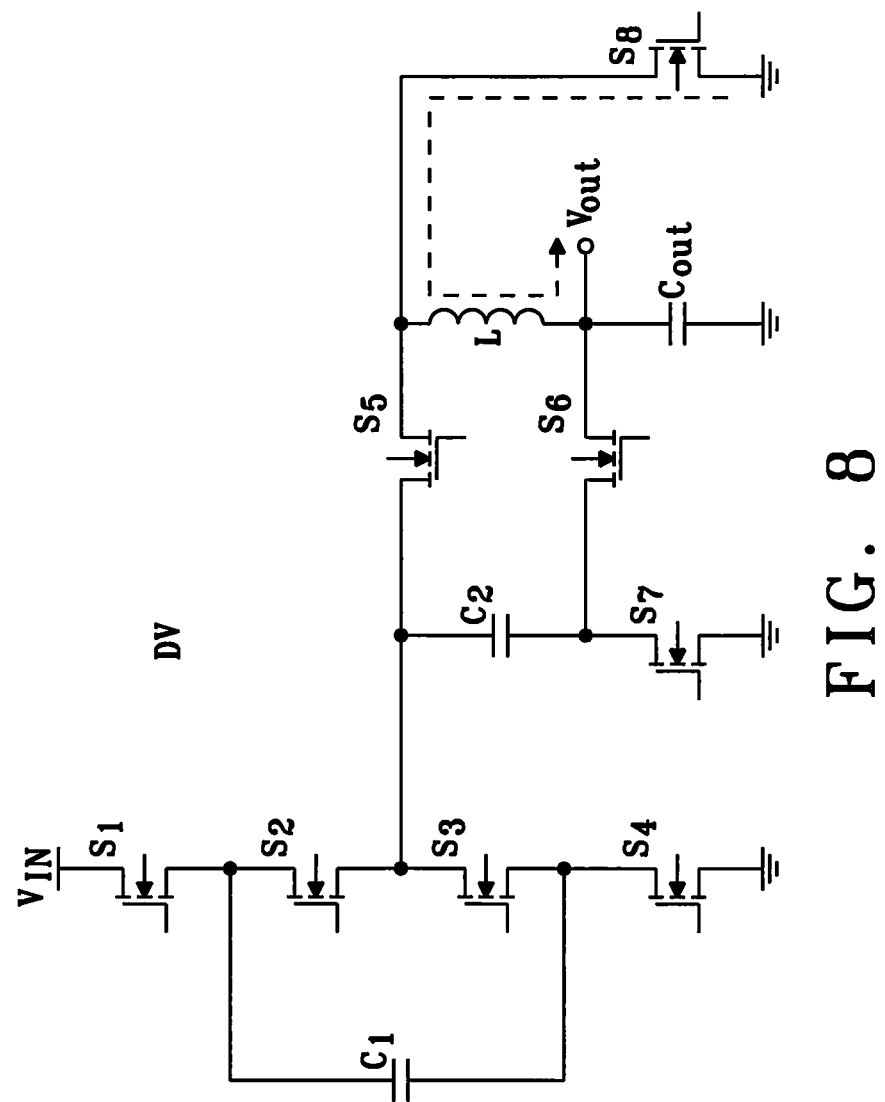
FIG. 8 shows a demagnetizing state of the power converter of FIG. 6.

FIG. 8 shows a demagnetizing state (DV) of the power converter of FIG. 6. The dashed arrow represents the current flow during this state. During state DV, the inductor may be demagnetized by closing switch S8 (all other switches may be open). The voltage across the inductor is $v_L = -V_{OUT}$. The state DV may end when zero current is detected in the inductor (or equivalently in switch S8).

Figure 9:
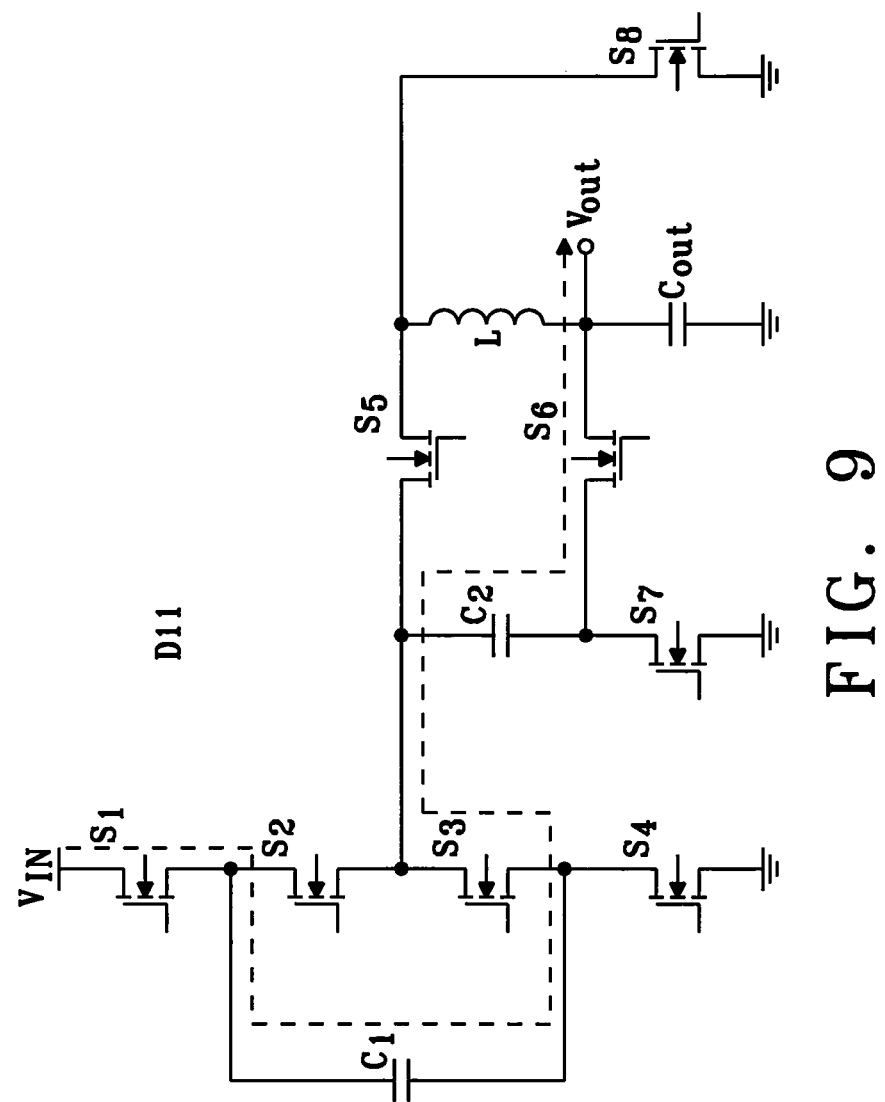
FIG. 9 shows a first capacitive sub-state of the power converter of FIG. 6.
Figure 10:
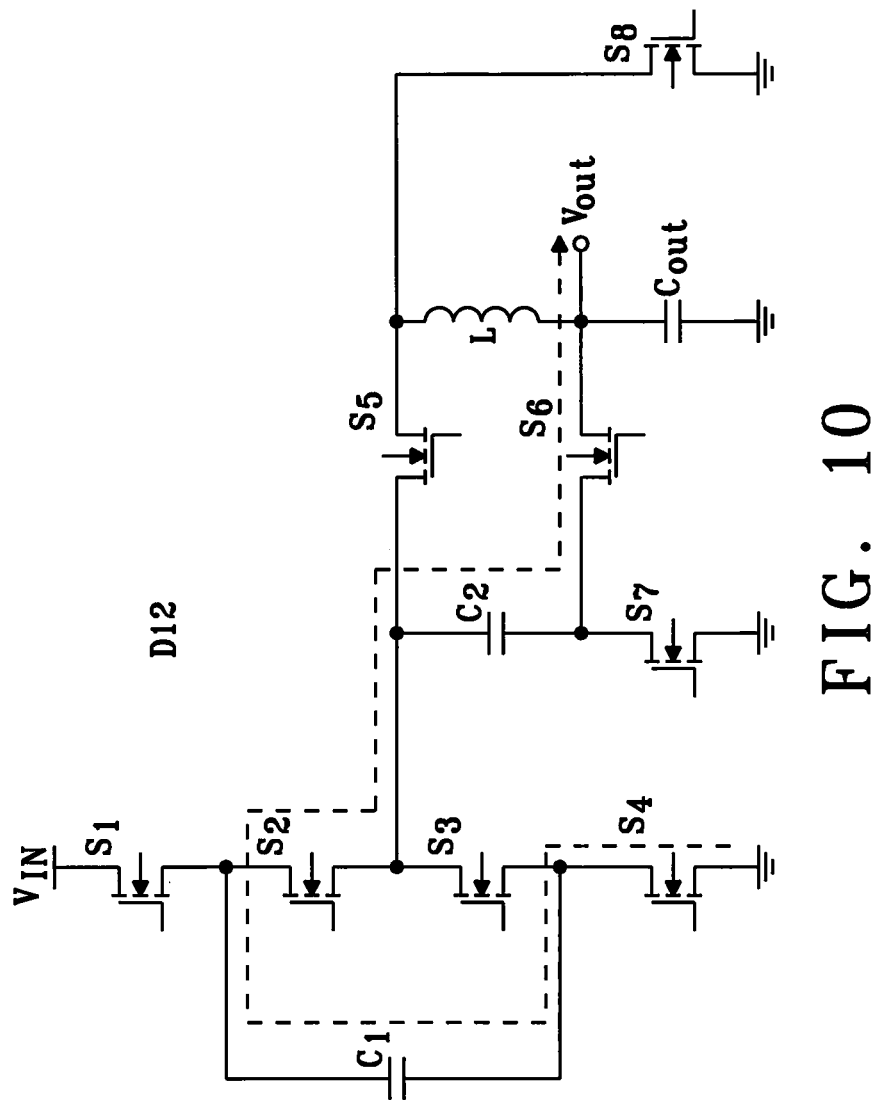
FIG. 10 shows a second capacitive sub-state of the power converter of FIG. 6.
Figure 11:
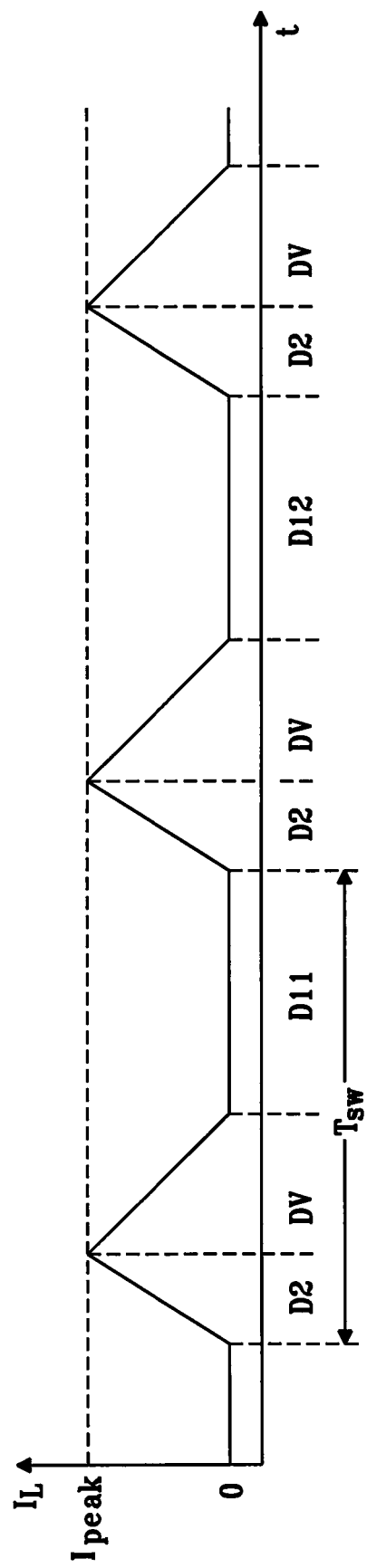
FIG. 11 shows the inductor current behavior during the different converter states of the power converter of FIG. 6.

FIG. 9 shows a first capacitive sub-state (D11) of the power converter of FIG. 6. FIG. 10 shows a second capacitive sub-state (D12) of the power converter of FIG. 6. The dashed arrows represent the current flows during said states. During states D11 and D12, no current flows through the inductor. However, a current path is established between the input and the output ports via the capacitors $C_1$ and $C_2$. In other words, part of the load current bypasses the inductor. Therefore, no DCR losses are associated with the output current during these states. D11 and D12 states alternate: each state occurs every other switching period. This is illustrated in FIG. 11, wherein FIG. 11 shows the inductor current behavior during the different converter states of the power converter of FIG. 6. A complete DCM sequence that guarantees the charge balance on all flying capacitors is: D2, DV, D11, D2, DV, D12. During these states, the load of the first stage (2:1 capacitor divider) is purely capacitive. Therefore, the first stage behaves as 2:1 capacitor divider and the voltage across $C_1$ as well as the first stage output are automatically regulated at $V_{IN}/2$. The voltage across the capacitor $C_2$ (VIN/2−$V_{OUT}$) is also defined by the Kirchhoff Voltage Law (KVL) as it is connected between the first stage output ($V_{IN}/2$) and the output voltage $V_{OUT}$. The states D11 and D12 end when the output voltage drops below the output reference voltage. The charge balance on capacitor $C_1$ is guaranteed during phases D11 (charge) and D12 (discharge). Instead, the charge balance on capacitor $C_2$ is guaranteed during phases D2 (discharge) and D11 (charge) as well as during phases D2 (discharge) and D12 (charge).

The total load current is the sum of average inductor current and the average bypass current (flowing through switch S6). The average inductor current in a switching period is (charge in a period)

$$I_L = \frac{(D2 + DV) \cdot I_{peak}}{2},$$

where D2 and DV represent the fraction of switching period $T_{SW}$ for the corresponding states. The average current bypassing the inductor can be expressed as $$I_{BYP} = \frac{D2 \cdot I_{peak}}{2}.$$

The latter equation is calculated by considering that the charge removed from the capacitor C2 during D2 must be equal to that supplied during D11/D12. The maximum value bypass current of $I_{OUT}/3$ is achieved when the magnetization and de-magnetization states have the same duration (D2=DV), that is when $V_{OUT}=V_{IN}/6$. This corresponds to up 55% less inductor DCR losses. In steady state conditions, the voltage rating may be expressed as:

$V_{IN}/2$ for switches S1, S2, S3, S4
$V_{IN}/2−V_{OUT}$ for S5 and S8
$V_{OUT}$ for S6 and S7.

In general, the described topology achieves power conversion with a small input-to-output voltage conversion ratio $V_{OUT}/V_{IN}$ with higher efficiency and smaller area than a conventional buck converter. It comprises two-stage topology with flying capacitors, wherein flying capacitor regulation is inherently achieved by the topology. That is, the voltage across the capacitors is defined by KVL during the operation of the converter. A 4:1 power conversion may be achieved in discontinuous conduction mode operation with up to ⅓ of output current bypassing the inductor. In summary, the advantages of the described topology include: no regulation required for flying capacitors, reduced voltage rating for MOSFET devices for the same input and output voltages, reduced number of MOSFET device, reduced losses associated to the inductor DCR for the same output current, and reduced current rating for the inductor (e.g. with regard to the example in FIG. 3). In this regard, the current rating of the inductor may be regarded as the maximum current that the inductor may carry without getting damaged and up to which its nominal inductance may be guaranteed (saturation current).

Figure 12:
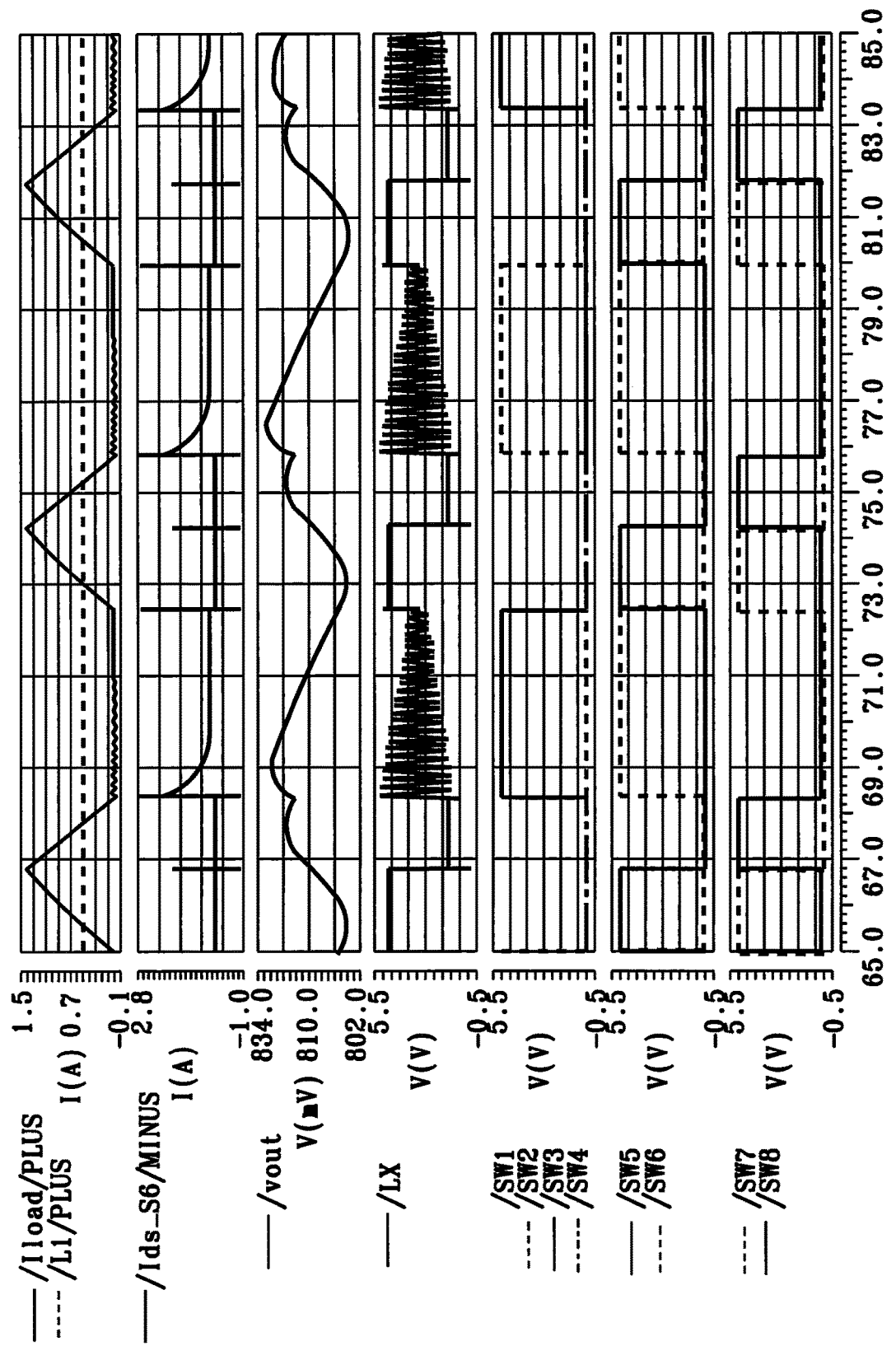
FIG. 12 shows simulation results.

FIG. 12 shows simulation results of the hybrid 4:1 multi-level converter of FIG. 6 for $V_{IN}$=5 V and $V_{OUT}$=0.833 V and a load of 0.5 A. The DCM operation is determined by a peak inductor current limit of 1.4 A. The effective capacitance of C1 and C2 is 40 uF, the inductance is 1 uH and the output capacitance is 50 uF. The switching frequency resulting from the DCM operation is ~133 kHz. Using the above equations, it is possible to calculate that the bypass current in this example is 167 mA (=500 mA/3).

Figure 13:
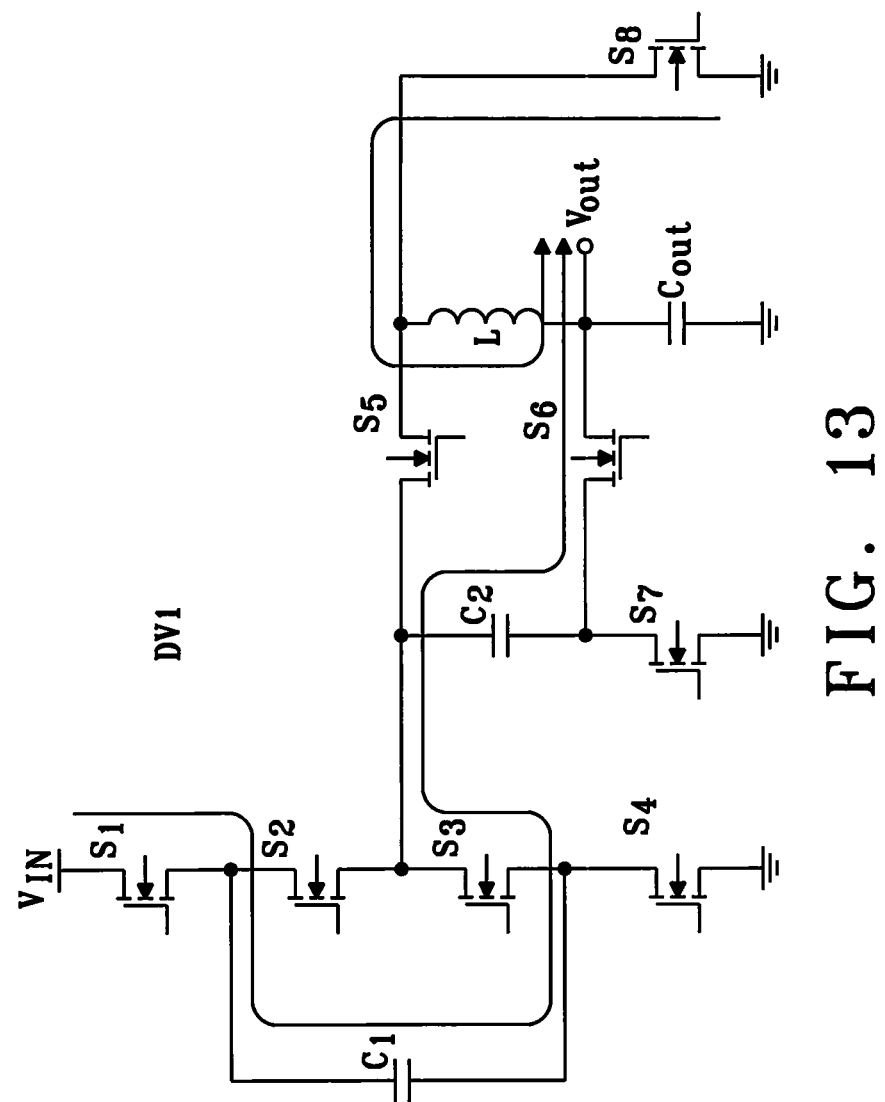
FIG. 13 shows a first demagnetizing sub-state of the power converter of FIG. 6.
Figure 14:
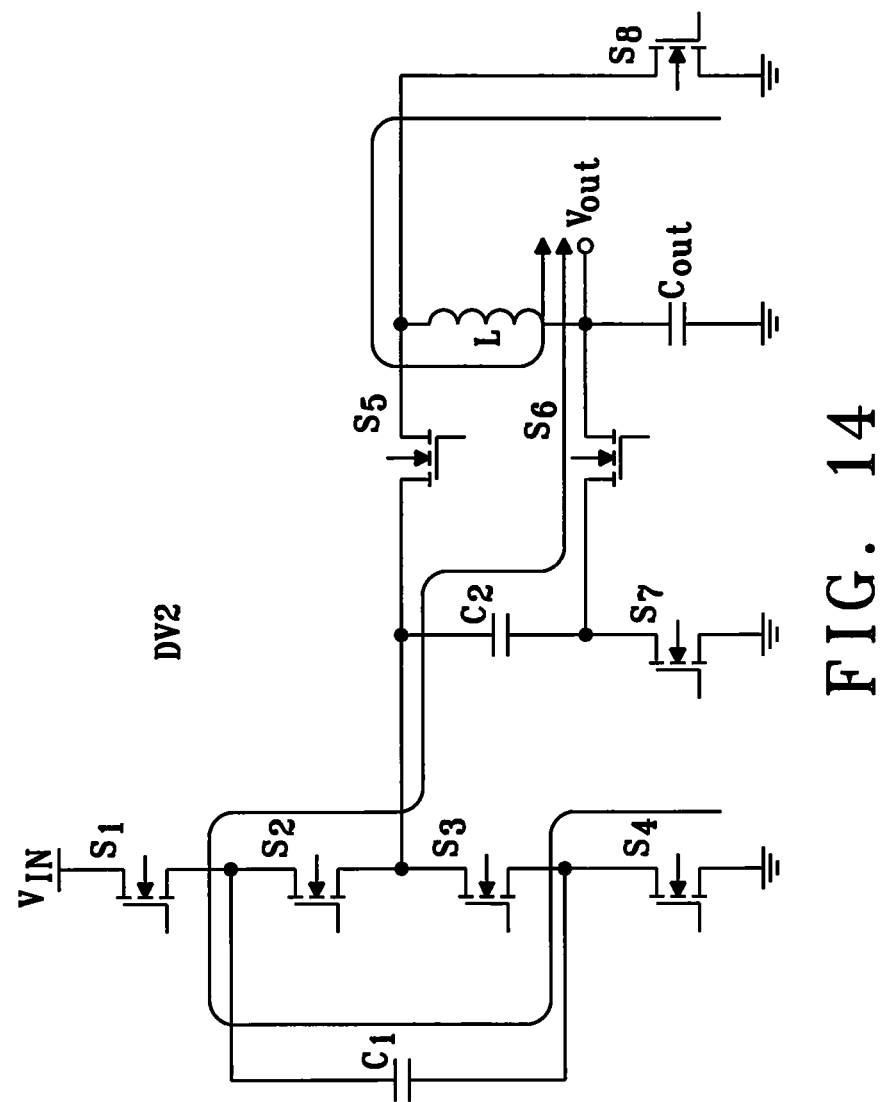
FIG. 14 shows a second demagnetizing sub-state of the power converter of FIG. 6.

Moreover, the topology of FIG. 6 can be operated in continuous current mode (CCM) using the switching states illustrated in FIG. 13 and FIG. 14. In this regard, FIG. 13 shows a first demagnetizing sub-state DV1 of the power converter of FIG. 6, and FIG. 14 shows a second demagnetizing sub-state DV2 of the power converter of FIG. 6. The flying capacitors $C_1$ and $C_2$ are automatically regulated to $V_{IN}/2$ and $V_{IN}/2−V_{OUT}$. A exemplary CCM sequence that guarantees no net change of inductor current in one complete switching cycle (volt-sec balance condition) on the inductor and the charge balance (amp-sec balance condition) on all flying capacitors is: D2, DV1, D2, DV2.

The input-to-output conversion ratio can be expressed as (with 2·D2=D and DV1+DV2=1−D):

$$\frac{V_{OUT}}{V_{IN}} = \frac{D}{2(1+D)} \quad D \in [0, 1]$$

Figure 15:
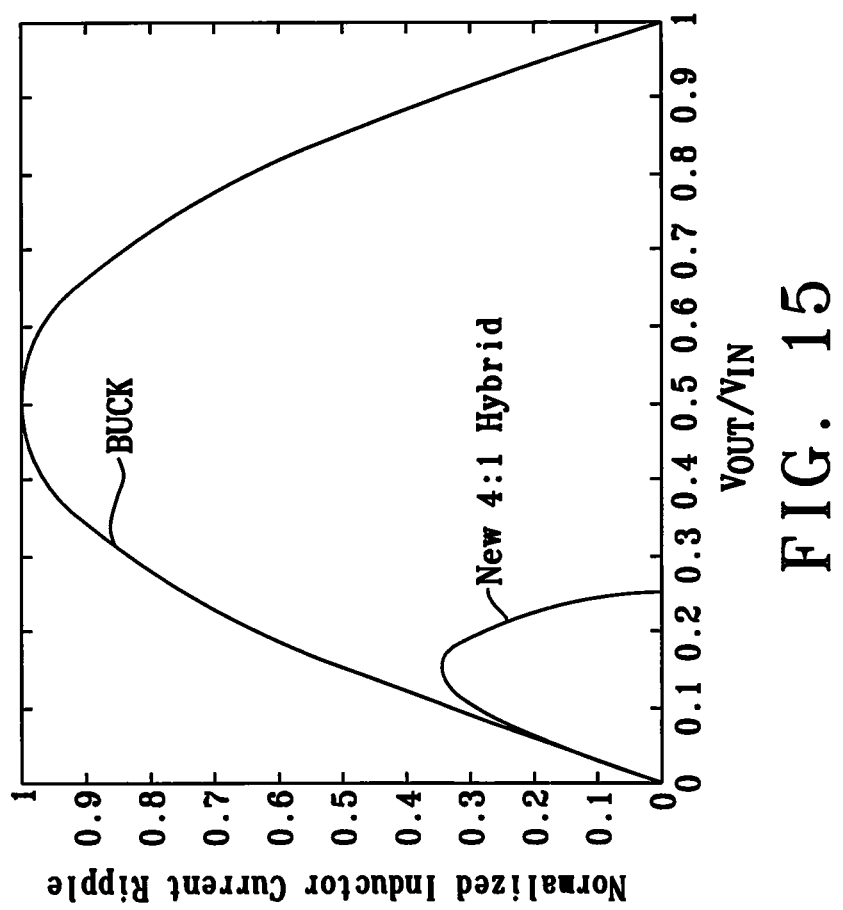
FIG. 15 shows further simulation results.

The maximum theoretical input-to-output voltage conversion ratio $V_{OUT}$/VIN is ¼ for D=1. FIG. 15 shows the inductor current ripple $\Delta I_L$ comparison between a buck power converter (0<$V_{OUT}/V_{IN}$<1) and the new 4:1 hybrid power converter (0<$V_{OUT}/V_{IN}$<0.25) in CCM operation. Because of the reduced $\Delta I_L$ inductor core losses are significantly reduced for 0<$V_{OUT}/V_{IN}$<0.25.

Figure 16:
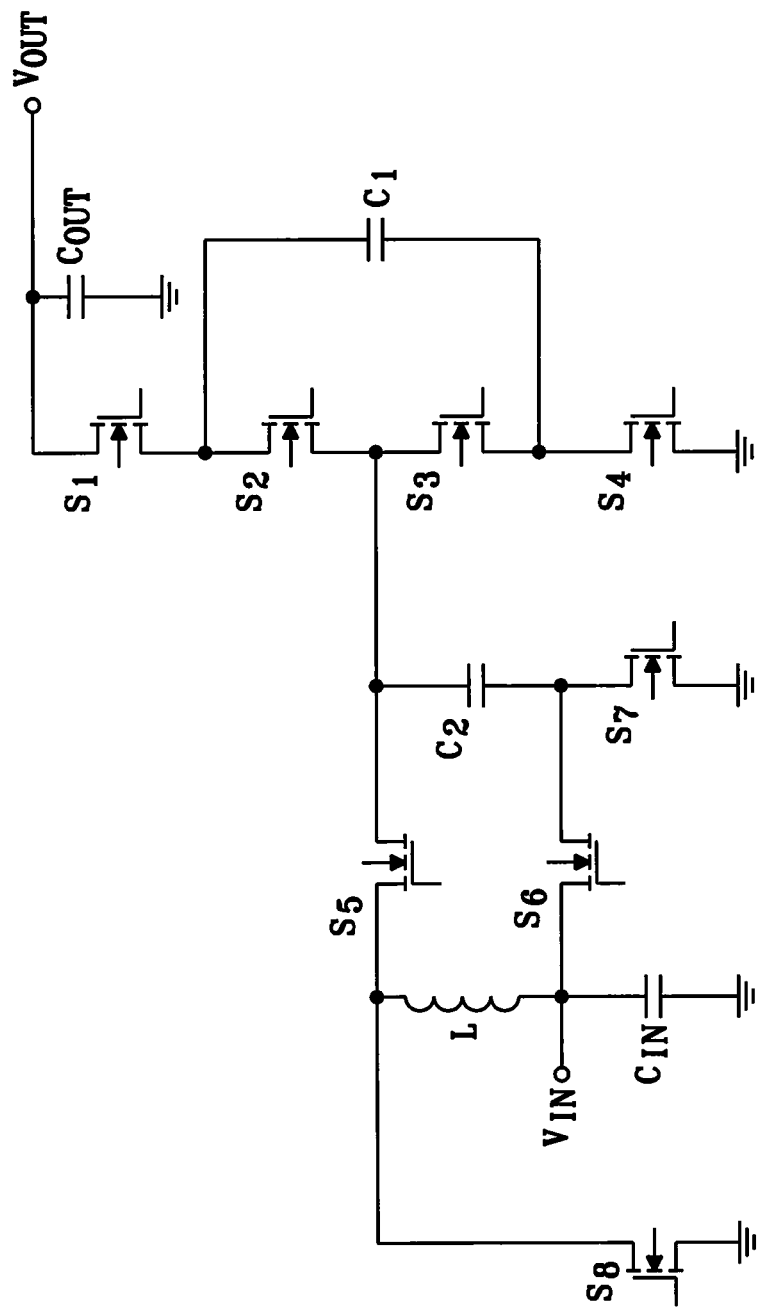
FIG. 16 shows an exemplary boost converter topology.

Finally, by inverting the roles of input and output ports, the described topology (FIG. 6) can be used to perform an efficient boost power conversion with $V_{IN}/V_{OUT}$>4 as shown in FIG. 16. FIG. 16 shows an exemplary boost converter topology, and FIGS. 17A, 17B, 17C and 17D show different states of the exemplary boost converter topology of FIG. 16. Thus, since the boost topology is obtained by inverting the roles of input and output ports, the above description with regard to the buck converter in FIG. 6 applies to the boost converter in FIG. 16 by replacing magnetizing states with de-magnetizing states and vice-versa, and is thus omitted here.

The exemplary power converter in FIG. 16 comprises a second stage with a first flying capacitor ($C_1$), a first switch (S1), a second switch (S2), a third switch (S3), and a fourth switch (S4). The first stage comprises a second flying capacitor ($C_2$), an inductor (L), a bypass switch (S6), a first demagnetizing switch ($S_5$), a second demagnetizing switch ($S_7$), a magnetizing switch ($S_8$), and an input capacitor ($C_m$). The exemplary power converter in FIG. 16 multiplies the input voltage by a factor of 4 and divides the input current by a factor of >4.

The operation states of the boost topology are shown in FIGS. 17A, 17B, 17C and 17D. The complete DCM switching sequence that satisfies both the volt-sec balance condition on the inductor and the amp-sec balance condition on the flying capacitors is: DP, D2, D11, DP, D2, D12. In the boost topology, the input current $I_{IN}$ is partially flowing into the inductor. The voltage on the flying capacitors $C_1$ and $C_2$ is $V_{OUT}/2-V_{in}$ and $V_{OUT}/2$, respectively. The de-magnetization state DV of the buck operation becomes a magnetization state DP in boost operation. During D2, the inductor is de-magnetized. During D11 and D12, the current path involving the flying capacitors does not go through the inductor.

Figure 18:
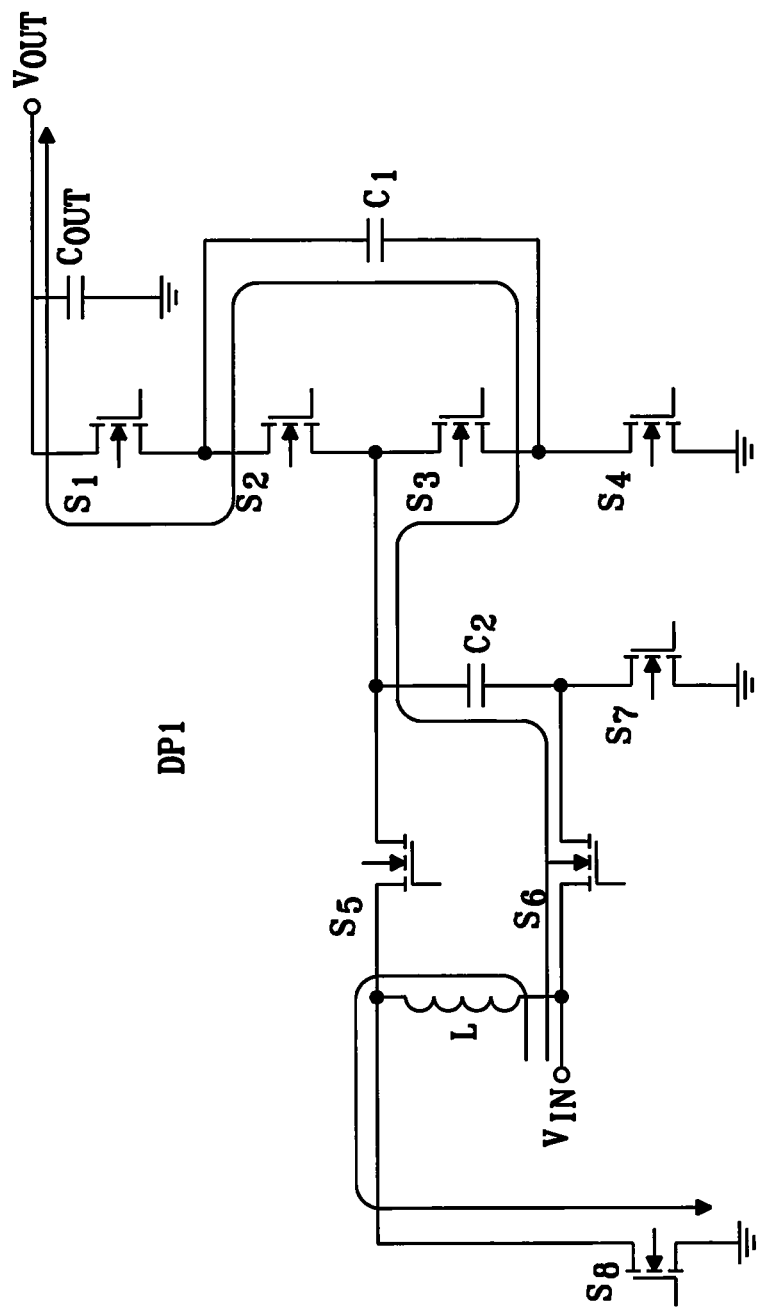
FIG. 18 shows a first magnetizing sub-state of the power converter of FIG. 16.
Figure 19:
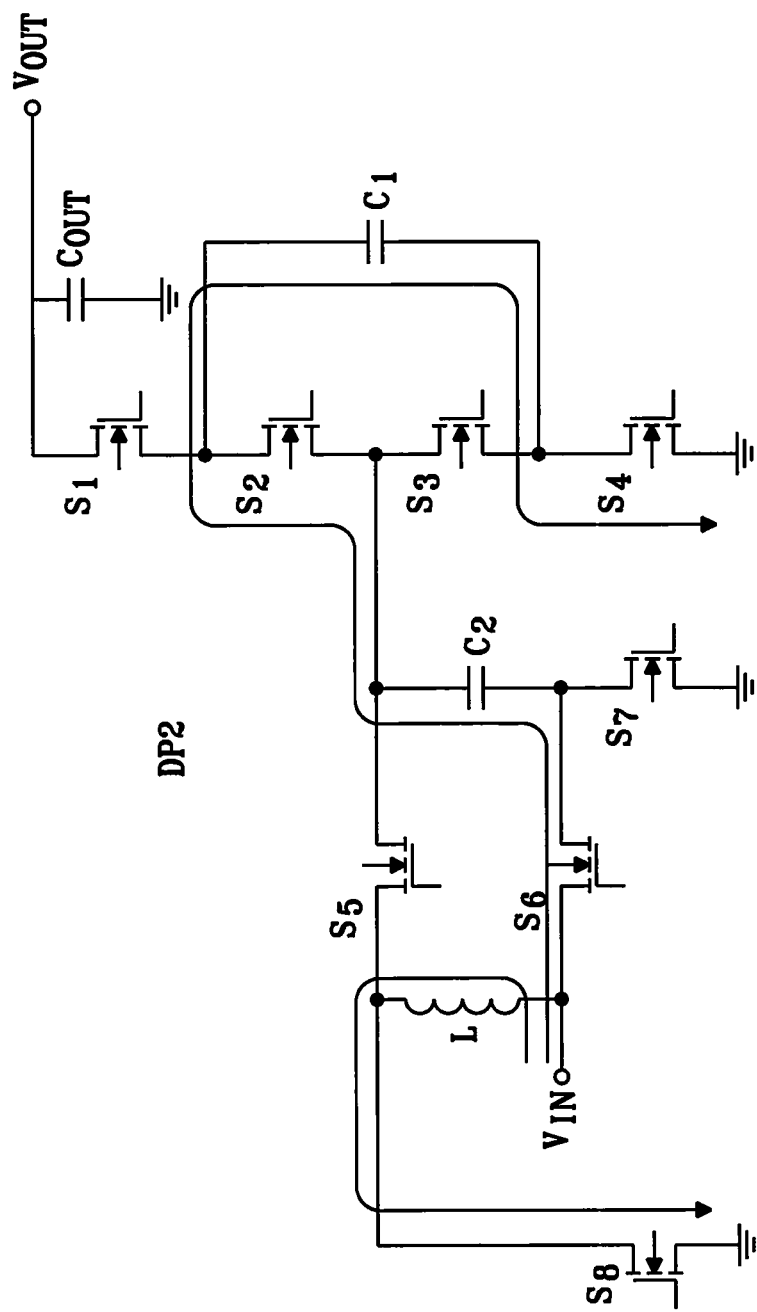
FIG. 19 shows a second magnetizing sub-state of the power converter of FIG. 16.

FIGS. 18 and 19 show corresponding CCM states for the boost operation. In particular, FIG. 18 shows a first magnetizing sub-state DP1 of the power converter of FIG. 16. FIG. 19 shows a second magnetizing sub-state DP2 of the power converter of FIG. 16. States DP1 and DP2 represent magnetizing states. These are interleaved with the de-magnetizing state D2. It should be pointed out that during the magnetizing states current is provided to the output through a path not involving the inductor.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter comprising a first stage coupled between an input of the power converter and an intermediate node, and a second stage coupled between the intermediate node and an output of the power converter, wherein the first stage comprises a capacitive voltage divider with a first flying capacitor, and wherein the second stage comprises a second flying capacitor and an inductor, wherein the power converter is configured to establish, in a magnetizing state, a magnetizing current path in the second stage from the intermediate node via the inductor to the output of the power converter,
   in a demagnetizing state, a demagnetizing current path from a reference potential via the inductor to the output of the power converter, wherein the demagnetizing state comprises a first demagnetizing sub-state or a second demagnetizing sub-state,
   in the first demagnetizing sub-state, said demagnetizing current path and a current path from the input of the power converter, via the first flying capacitor, via the second flying capacitor, to the output of the power converter,
   in the second demagnetizing sub-state, said demagnetizing current path and a current path from the reference potential, via the first flying capacitor, via the second flying capacitor, to the output of the power converter, and
   in a capacitive state, a parallel current path in the second stage from the intermediate node via the second flying capacitor to the output of the power converter.

2. The power converter according to claim 1, comprising a bypass switch, wherein the power converter is configured to establish the parallel current path during the capacitive state from the intermediate node
   via the second flying capacitor and
   via the bypass switch
   to the output of the power converter.

3. The power converter according to claim 1, comprising a first magnetizing switch and a second magnetizing switch, wherein the magnetizing current path further goes
   via the second magnetizing switch
   from the second flying capacitor to the inductor, wherein the magnetizing current path further includes a path from a reference potential
   via the first magnetizing switch, and
   via the second flying capacitor
   to the intermediate node, and wherein the power converter is configured to establish the magnetizing current path during the magnetizing state.

4. The power converter according to claim 1, wherein the power converter is configured to switch from the magnetizing state to the demagnetizing state when a current through the inductor reaches a first current threshold.

5. The power converter according to claim 1, wherein the power converter is configured to switch from the capacitive state to the magnetizing state when an output voltage at the output of the power converter falls below an output reference voltage.

6. The power converter according to claim 1, wherein the power converter is configured to switch between the different states according to the following ordered state sequence:
   the magnetizing state;
   the first demagnetizing sub-state;
   the magnetizing state;
   the second demagnetizing sub-state.

7. The power converter according to claim 6, comprising a demagnetizing switch, wherein the power converter is configured to establish the demagnetizing current path during the demagnetizing state from the reference potential
   via the demagnetizing switch and
   via the inductor
   to the output of the power converter.

8. The power converter according to claim 6, wherein the capacitive state comprises is either a first capacitive sub-state or a second capacitive sub-state, and the power converter is further configured to establish,
   in the first capacitive sub-state, a first current path in the first stage from the input of the power converter via the first flying capacitor to the intermediate node, and to establish,
   in the second capacitive sub-state, a second current path in the first stage from a reference potential via the first flying capacitor to the intermediate node.

9. The power converter according to claim 8, comprising a first switch, a second switch, a third switch, and a fourth switch, wherein the power converter is configured to establish,
   in the first capacitive sub-state, the first current path from the input of the power converter, via the first switch, via the first flying capacitor, and via the third switch to the intermediate node, and to establish,
   in the second capacitive sub-state, the second current path from the reference potential, via the fourth switch, via the first flying capacitor, and via the second switch to the intermediate node.

10. The power converter according to claim 8, wherein the power converter is configured to switch between the different states according to the following ordered state sequence:
the magnetizing state;
the demagnetizing state;
the first capacitive sub-state;
the magnetizing state;
the demagnetizing state;
the second capacitive sub-state.

11. The power converter according to claim 6, wherein the power converter is configured to switch between the different states according to the following ordered state sequence:
the magnetizing state;
the demagnetizing state;
the capacitive state.

12. The power converter according to claim 6, wherein the power converter is configured to switch from the demagnetizing state to the capacitive state when a current through the inductor reaches a second current threshold.

13. A method of operating a power converter, the power converter comprising a first stage coupled between an input of the power converter and an intermediate node, and a second stage coupled between the intermediate node and an output of the power converter, wherein the first stage comprises a capacitive voltage divider with a first flying capacitor, and wherein the second stage comprises a second flying capacitor and an inductor, wherein the method comprises
establishing, in a magnetizing state, a magnetizing current path in the second stage from the intermediate node via the inductor to the output of the power converter;
establishing, in a demagnetizing state, a demagnetizing current path from a reference potential via the inductor to the output of the power converter, wherein the demagnetizing state comprises a first demagnetizing sub-state or a second demagnetizing sub-state,
establishing, in the first demagnetizing sub-state, said demagnetizing current path and a current path from the input of the power converter, via the first flying capacitor, via the second flying capacitor, to the output of the power converter,
establishing, in the second demagnetizing sub-state, said demagnetizing current path and a current path from the reference potential, via the first flying capacitor, via the second flying capacitor, to the output of the power converter, and
establishing, in a capacitive state, a parallel current path in the second stage from the intermediate node via the second flying capacitor to the output of the power converter.

14. The method according to claim 13, the method comprising
establishing the parallel current path during the capacitive state from the intermediate node via the second flying capacitor and via a bypass switch to the output of the power converter.

15. The method according to claim 13, the magnetizing current path further going
via a second magnetizing switch
from the second flying capacitor to the inductor, wherein the magnetizing current path further includes a path
via a first magnetizing switch,
via the second flying capacitor,
to the intermediate node,
the method comprising establishing the magnetizing current path during the magnetizing state.

16. The method according to claim 13, the method comprising establishing the demagnetizing current path during the demagnetizing state from the reference potential
via a demagnetizing switch and
via the inductor
to the output of the power converter.

17. The method according to claim 13, wherein the capacitive state comprises a first capacitive sub-state or a second capacitive sub-state, wherein the method further comprises
establishing, in the first capacitive sub-state, a first current path in the first stage from the input of the power converter via the first flying capacitor to the intermediate node; and
establishing, in the second capacitive sub-state, a second current path in the first stage from a reference potential via the first flying capacitor to the intermediate node.

18. The method according to claim 13, wherein the method comprises switching between the different states according to the following ordered state sequence:
from the magnetizing state;
to the demagnetizing state;
to the capacitive state.

19. The method according to claim 13, wherein the method comprises switching from the magnetizing state to the demagnetizing state when a current through the inductor reaches a first current threshold.

20. The method according to claim 13, wherein the method comprises switching from the demagnetizing state to the capacitive state when a current through the inductor reaches a second current threshold.

21. The method according to claim 13, wherein the method comprises switching from the capacitive state to the magnetizing state when an output voltage at the output of the power converter falls below an output reference voltage.

22. The method according to claim 13, wherein the method comprises switching between the different states according to the following ordered state sequence:
from the magnetizing state;
to the first demagnetizing sub-state;
to the magnetizing state;
to the second demagnetizing sub-state.

23. The method according to claim 17, the method comprising
establishing, in the first capacitive sub-state, the first current path from the input of the power converter, via a first switch, via the first flying capacitor, and via a third switch to the intermediate node; and
establishing, in the second capacitive sub-state, the second current path from the reference potential, via a fourth switch, via the first flying capacitor, and via a second switch to the intermediate node.

24. The method according to claim 23, wherein the method comprises switching between the different states according to the following ordered state sequence:
from the magnetizing state;
to the demagnetizing state;
to the first capacitive sub-state;
to the magnetizing state;
to the demagnetizing state;
to the second capacitive sub-state.

25. A power converter comprising a first stage coupled between an input of the power converter and an intermediate node, and a second stage coupled between the intermediate node and an output of the power converter, wherein the second stage comprises a capacitive voltage multiplier with a first flying capacitor, and wherein the first stage comprises a second flying capacitor and an inductor, wherein the power converter is configured to establish,
   in a demagnetizing state, a demagnetizing current path in the first stage from the input of the power converter via the inductor to the intermediate node,
   in a magnetizing state, a magnetizing current path from the input of the power converter via the inductor to a reference potential, wherein the magnetizing state comprises a first magnetizing sub-state or a second magnetizing sub-state,
   in the first magnetizing sub-state, said magnetizing current path and a current path from the input of the power converter, via the second flying capacitor, via the first flying capacitor to the output of the power converter, and to establish,
   in the second magnetizing sub-state, said magnetizing current path and a current path from the input of the power converter, via the second flying capacitor, via the first flying capacitor to a reference potential, and
   in a capacitive state, a parallel current path in the first stage from the input of the power converter via the second flying capacitor to the intermediate node.

26. The power converter according to claim 20, comprising a bypass switch, wherein the power converter is configured to establish the parallel current path during the capacitive state from the input of the power converter
   via the bypass switch and
   via the second flying capacitor
   to the intermediate node.

27. The power converter according to claim 20, comprising a first demagnetizing switch and a second demagnetizing switch, wherein the demagnetizing current path further goes
   via the first demagnetizing switch,
   from the inductor to the intermediate node, wherein the demagnetizing current path further includes a path from the intermediate node
   via the second flying capacitor, and
   via the second demagnetizing switch,
   to a reference potential, wherein the power converter is configured to establish the demagnetizing current path during the demagnetizing state.

28. The power converter according to claim 25, comprising a magnetizing switch, wherein the power converter is configured to establish the magnetizing current path during the magnetizing state from the input of the power converter
   via the inductor and
   via the magnetizing switch
   to the reference potential.

29. The power converter according to claim 20, wherein the capacitive state comprises a first capacitive sub-state or a second capacitive sub-state, and the power converter is configured to establish,
   in the first capacitive sub-state, a first current path in the second stage from the intermediate node via the first flying capacitor to the output of the power converter, and to establish,
   in the second capacitive sub-state, a second current path in the second stage from the intermediate node via the first flying capacitor to a reference potential.

30. The power converter according to claim 25, wherein the power converter is configured to switch between the different states according to the following ordered state sequence:
   the demagnetizing state;
   the first magnetizing sub-state;
   the demagnetizing state;
   the second magnetizing sub-state.

31. A method of operating a power converter, wherein the power converter comprises a first stage coupled between an input of the power converter and an intermediate node, and a second stage coupled between the intermediate node and an output of the power converter, wherein the second stage comprises a capacitive voltage multiplier with a first flying capacitor, and wherein the first stage comprises a second flying capacitor and an inductor, wherein the method comprises
   establishing, in a demagnetizing state, a demagnetizing current path in the first stage from the input of the power converter via the inductor to the intermediate node,
   establishing, in a magnetizing state, a magnetizing current path from the input of the power converter via the inductor to a reference potential, wherein the magnetizing state comprises a first magnetizing sub-state or a second magnetizing sub-state,
   establishing, in the first magnetizing sub-state, said magnetizing current path and a current path from the input of the power converter, via the second flying capacitor, via the first flying capacitor to the output of the power converter,
   establishing, in the second magnetizing sub-state, said magnetizing current path and a current path from the input of the power converter, via the second flying capacitor, via the first flying capacitor to a reference potential, and
   establishing, in a capacitive state, a parallel current path in the first stage from the input of the power converter via the second flying capacitor to the intermediate node.

* * * * *